(12) United States Patent
Rabnawaz et al.

(10) Patent No.: US 12,018,136 B2
(45) Date of Patent: Jun. 25, 2024

(54) THERMALLY REVERSIBILE CROSSLINKED POLYOLEFINS AND RELATED POLYMERS, AND RELATED METHODS

(71) Applicant: BOARD OF TRUSTEES OF MICHIGAN STATE UNIVERSITY, East Lansing, MI (US)

(72) Inventors: Muhammad Rabnawaz, East Lansing, MI (US); Muhammad Naveed, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 204 days.

(21) Appl. No.: 17/532,610

(22) Filed: Nov. 22, 2021

(65) Prior Publication Data
US 2022/0162402 A1 May 26, 2022

Related U.S. Application Data

(60) Provisional application No. 63/117,580, filed on Nov. 24, 2020.

(51) Int. Cl.
*C08K 5/14* (2006.01)
*C08J 3/24* (2006.01)
(Continued)

(52) U.S. Cl.
CPC .............. *C08J 3/243* (2013.01); *C08J 11/18* (2013.01); *C08K 5/0025* (2013.01); *C08K 5/053* (2013.01);
(Continued)

(58) Field of Classification Search
CPC ........ C08J 3/243; C08J 11/18; C08J 2323/06; C08J 2323/12; C08J 3/24; C08J 11/12;
(Continued)

(56) References Cited

U.S. PATENT DOCUMENTS 3,113,934 A * 12/1963 Grossman ................ H01B 3/28
525/193
5,395,895 A * 3/1995 Tagoshi ................... C08K 5/06
525/384

(Continued)

FOREIGN PATENT DOCUMENTS

| WO | WO-2020/142578 A1 | 7/2020 |
| WO | WO-2020/160089 A1 | 8/2020 |
| WO | WO-2022/015782 A1 | 1/2022 |

OTHER PUBLICATIONS

Ricarte, Macromolecules 2019, 52 p. 432-443 (Year: 2019).*
Van der mee, Journal of Polymer Science: Part A: Polymer Chemistry, vol. 46, 1810-1825 (2008) (Year: 2008).*

*Primary Examiner* — Robert C Boyle
(74) *Attorney, Agent, or Firm* — MARSHALL, GERSTEIN & BORUN LLP

(57) ABSTRACT

The disclosure relates to thermally reversibly crosslinked polyolefins (TRC-PO) and methods for making the same. A TRC-PO can be formed by reactive melt-processing a mixture including (i) a polyolefin, (ii) an initiator, and (iii) a reversible crosslinker. The reversible crosslinker includes (A) a grafting agent moiety selected from unsaturated cyclic anhydrides, unsaturated cyclic imides, cyclic nitroxides, and ring-opened analogs thereof, and (B) a crosslinking moiety bound to the cyclic grafting agent moiety. This reactive melt-processing, for example including reactive extrusion, forms a thermally reversibly crosslinked (TRC) polyolefin with polyolefin chains reversibly crosslinked via the reversible crosslinkers, which provide dynamic covalent bonds, such as siloxanes and esters, that are amenable to melt re-processing to re-from or otherwise re-use the TRC-PO while still retaining the reversible crosslinks after re-processing. Catalysts and additives such as rheology modifiers can be added to the melt-processing mixture.

59 Claims, 7 Drawing Sheets

A) PE-Silyl ethers

B) PE-esters.

(51) Int. Cl.
  *C08J 11/18* (2006.01)
  *C08K 5/00* (2006.01)
  *C08K 5/053* (2006.01)
  *C08K 5/1539* (2006.01)
  *C08K 5/20* (2006.01)
  *C08L 51/06* (2006.01)

(52) U.S. Cl.
  CPC .............. *C08K 5/14* (2013.01); *C08K 5/1539* (2013.01); *C08K 5/20* (2013.01); *C08L 51/06* (2013.01); *C08J 2323/06* (2013.01); *C08J 2323/12* (2013.01); *C08L 2207/062* (2013.01); *C08L 2312/00* (2013.01); *C08L 2314/00* (2013.01)

(58) Field of Classification Search
  CPC ........ C08K 5/0025; C08K 5/053; C08K 5/14; C08K 5/1539; C08K 5/20; C08L 51/06; C08L 2207/062; C08L 2312/00; C08L 2314/00; C08F 255/02; Y02W 30/62
  See application file for complete search history.

(56) References Cited

U.S. PATENT DOCUMENTS

| | | | |
|---|---|---|---|
| 2007/0149711 A1* | 6/2007 | Chaudhary | C08F 8/00 525/244 |
| 2021/0024452 A1 | 1/2021 | Rabnawaz | |
| 2021/0246333 A1 | 8/2021 | Rabnawaz et al. | |
| 2022/0040730 A1 | 2/2022 | Rabnawaz et al. | |
| 2022/0041787 A1 | 2/2022 | Rabnawaz et al. | |

* cited by examiner

A) PE-Silyl ethers

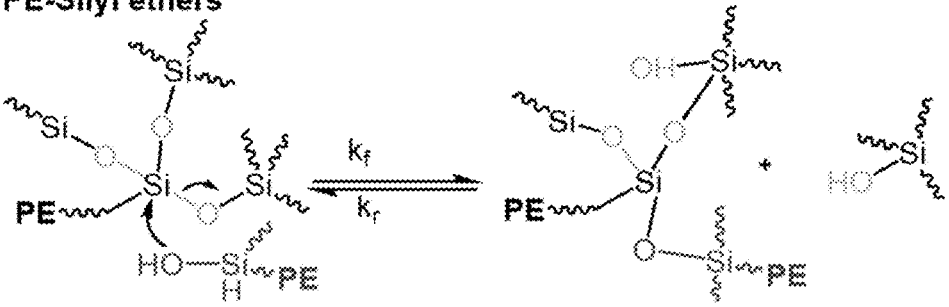

B) PE-esters.

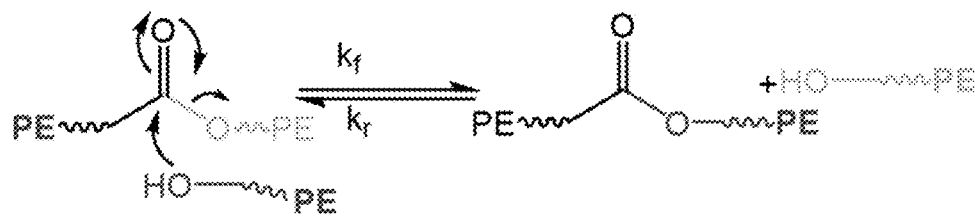

FIGURE 2

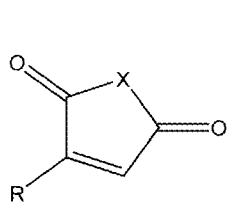

Where R= H, CH3

X=O
X= NR-Y- where R=alkyl or aryl
Y=epoxy, OH, carboxyl

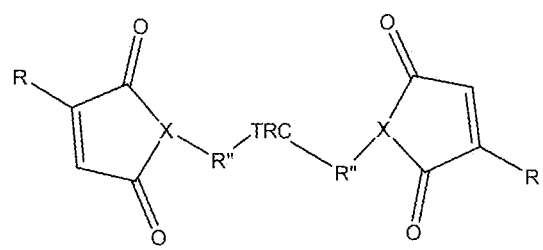

Where R= H, CH3

X= NR- where R=alkyl or aryl
TRC= reversible ester, silyl ether, etc

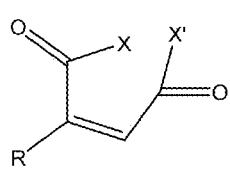

Where R= H, CH3

X=OH,OR, NHR where R= alkyl or aryl
X'=OH,OR, NHR-Y where R= alkyl or aryl,
Y=epoxy, OH, carboxyl, etc

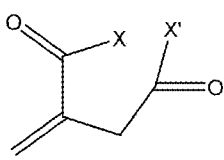

X=OH,OR, NHR where R= alkyl or aryl
X'=OH,OR, NHR-Y where R= alkyl or
aryl, Y=epoxy, OH, carboxyl, etc

FIGURE 3

A) Silyl-ether based TRC-PE using Maleimide
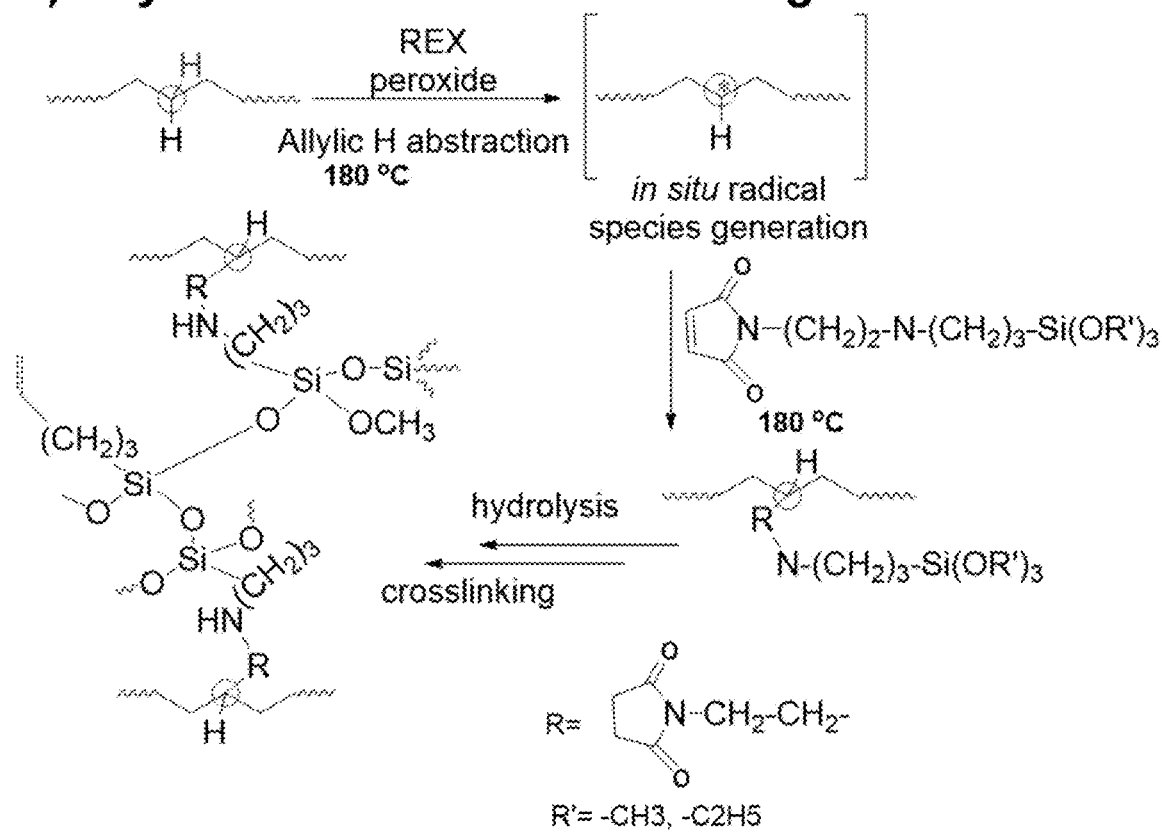
B) Silyl-ether based TRC-PE using TEMPO
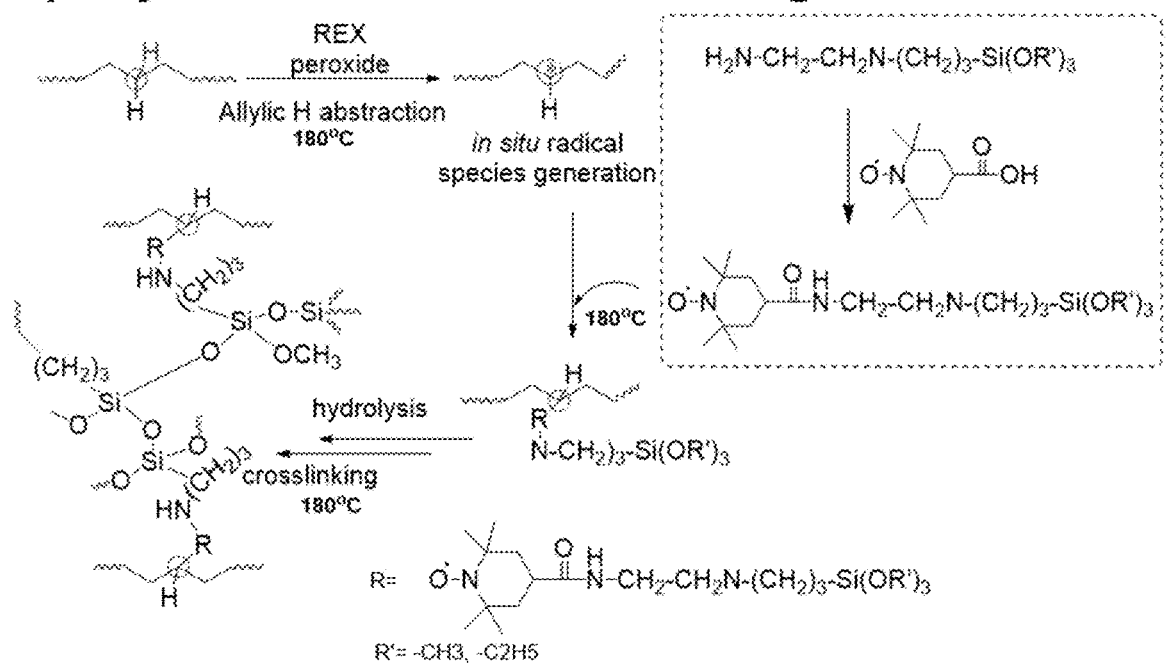
FIGURE 10

THERMALLY REVERSIBILE CROSSLINKED POLYOLEFINS AND RELATED POLYMERS, AND RELATED METHODS

CROSS REFERENCE TO RELATED APPLICATION

Priority is claimed to U.S. Provisional Application No. 63/117,580 filed on Nov. 24, 2020, which is incorporated herein by reference in its entirety.

STATEMENT OF GOVERNMENT INTEREST

This invention was made with government support under 2044877 awarded by the National Science Foundation. The government has certain rights in the invention.

BACKGROUND OF THE DISCLOSURE

Field of the Disclosure

The disclosure relates to thermally reversibly crosslinked polyolefins (TRC-PO) and methods for making the same. A TRC-PO can be formed by reactive melt-processing, for example reactively extruding, a mixture including (i) a polyolefin, (ii) an initiator, and (iii) a reversible crosslinker including a cyclic grafting agent moiety or ring-opened analog thereof. The TRC-PO includes polyolefin chains reversibly crosslinked via the reversible crosslinkers, which provide dynamic covalent bonds that are amenable to melt re-processing.

BRIEF DESCRIPTION OF RELATED TECHNOLOGY

Polymers are utilized as viable substitutes for metals and glass because of their inexpensive, flexible and lightweight nature, as well as their facile processing. Over 400 million metric tons of polymeric materials used today for a myriad of applications. These polymeric materials are classified into three types, including commodity thermoplastics, thermosets, and engineering polymers. As illustrated in FIG. 1, each of these materials have positive attributes as well as drawbacks in terms of their suitability for various applications. (1) Commodity thermoplastics, such as high-density polyethylene (HDPE) and polypropylene (PP) are inexpensive and suitable for routine applications such as packaging. However, these polymers are lacking the solvent-resistance, thermal-resistance, and mechanical robustness required for more demanding applications. (2) Thermosets, such as epoxy esters, are permanently crosslinked materials, with excellent solvent resistance and structural stability but exhibit poor melt-(re)processability. Thermosets account for about 20% of the total polymer materials produced annually at a scale of >65 million tons/year. However, thermosets, unlike thermoplastics, are difficult to melt-(re)process due to their densely crosslinked structures. (3) Engineering polymers, such as polycarbonates, offer impressive mechanical properties and creep resistance but are often expensive.

Each of the three classes of conventional polymer materials is comprised of a wide range of chemically distinct components with different melt-(re)processability parameters. Therefore, it is both challenging and expensive to separate and recycle these materials at the end of their service life-time. Consequently, about 91% of polymer-based materials end up in landfills or are incinerated after use, while thermosets are not recycled except for limited applications such as use fillers. In addition, about 13 million tons of plastics leak into the ocean and eventually break down into microplastics and nanoplastics, which pose a potential risk of contaminating aquatic organisms, and subsequently, the human food chain.

Covalent adaptable networks (CANs) with reversible bond structures (such as dynamic covalent bonds) in their polymer networks are becoming increasingly popular for applications as self-healing and smart materials. CANs are categorized into two different types that include dissociative and associative CANS. For dissociative CANs, a complete cleavage of the bonds occurs upon heating. These CANs are melt-(re)processable like thermoplastics above the de-crosslinking temperature. Diels-Alder chemistry is a well-known example of dissociative CANs. However, dissociative CANs are typically prepared via the incorporation of specialized and expensive functional groups, creating a challenge for their wide adoption for real-world applications. For associative CANs, exchange reactions occur without changes in the crosslinking density and they do not exhibit depolymerization upon heating. The existing covalent bonds are only broken when new ones are formed, making these networks stable while still remaining thermally-healable and moldable. Vitrimers are an example of associative CANs. Vitrimers were first developed with epoxy/acid or epoxy/anhydride polyester-based networks using a transesterification catalyst. As is the case with vitreous silica, thermally triggered catalytic transesterification reactions result in permanent polyester/polyol networks with viscosities that gradually decrease upon heating. The criteria for vitrimers are: (1) they are made of covalently bound chains forming an organic network; and (2) their network topology can be changed via exchange reactions that are associative in nature and thermally triggered, resulting in the thermal malleability of the network. At higher temperatures, the viscosities of vitrimers slowly decrease. This property distinguishes vitrimers from dissociative CANs and thermoplastic materials which evolve from a solid to a liquid state more abruptly. Exchange reactions allow the rearrangement of the network structures of vitrimers, thus enabling the material to be deformed and remolded. The nature of the catalyst is key to controlling the exchange rate of the reaction, and hence the malleability of the resultant vitrimers. Catalysts that decrease the activation energy for reversible reactions can effectively promote vitrimeric behavior at lower temperatures. Elevated temperatures enhance the exchange rate and decrease the viscosity, but they can also lead to chemical degradation. Furthermore, free OH groups, in the case of polyurethane (PUR) or epoxies/esters, are known to enhance the dynamicity of the covalent network.

SUMMARY

In one aspect, the disclosure relates to a method for forming a thermally reversibly crosslinked (TRC) polyolefin, the method comprising: reactive melt-processing a mixture comprising (i) a polyolefin, (ii) an initiator (e.g., peroxide), and (iii) a reversible crosslinker comprising (A) a grafting agent moiety selected from the group consisting of unsaturated cyclic anhydrides, unsaturated cyclic imides, cyclic nitroxides, and ring-opened analogs thereof and (B) a crosslinking moiety (e.g., silyl ether, ester) bound to the grafting agent moiety, thereby forming a thermally reversibly crosslinked polyolefin (TRC-PO) comprising polyolefin chains (reversibly) crosslinked via crosslinking moieties therebetween (e.g., via radical-addition-product linkages of the grafting agent moiety between the polyolefin chains and the reversible crosslinking moieties). The polyolefin can include common thermoplastics such as polyethylene (PE) and/or polypropylene (PP), but it more generally can include other polymers with a carbon-carbon backbone, for example -[—$CR_2$—$CR_2$—]- repeat units where the R groups on the backbone independently can be hydrogen atoms, alkyl groups, or other substituents).

The grafting agent or grafting agent moiety can be a cyclic grafting agent or moiety thereof, which can include unsaturated cyclic anhydrides, unsaturated cyclic imides, and cyclic nitroxides such as substituted or unsubstituted maleic anhydride, substituted or unsubstituted maleimide, or substituted or unsubstituted (2,2,6,6-tetramethylpiperidin-1-yl) oxidanyl ("TEMPO"). The grafting agents can be ring open analogs of cycling grafting agents such as dialkylmaleate. The grafting agent can include one compound or a mixture of compounds suitable for grafting, such as bismaleimide, dialkylmaleate, and maleic anhydride alone or in combination. The disclosed TRC-PO is suitably formed using of a grafting agent like maleic anhydride as compared to a vinyl or alkenyl analog (e.g., $CH_2$=CH—R, where R includes linking moieties and/or crosslinking moieties) to improve grafting and avoid homopolymerization as an important benefit of the disclosed methods and compositions. Accordingly, grafting agents according to the disclosure preferentially react via free-radical addition to the polyolefin backbone (i.e., the desired product providing a thermally reversible crosslinking functionality to the polyolefin) instead of via self-polymerization (i.e., an undesired product tending to leave the polyolefin with a lower degree of thermally reversible crosslinking functionality). Reversible crosslinking groups appended to the polyolefin backbone via the grafting agent are not particularly limited, but suitable examples include silyl ethers with and without secondary amino groups, esterification links with internal or external transesterification catalyst, etc.

The reversible crosslinker can be already formed when it is added to the reactive melt-processing mixture, for example as an anhydride or imide grafting agent already including a pending silyl ether/alkoxy silane group. Alternatively, the reversible crosslinker can be formed in situ during reactive melt-processing by adding a grafting agent reactive with the polyolefin and crosslinker reactive with the grafting agent to the reactive melt-processing mixture, for example separately adding maleic anhydride and a polyepoxide (e.g., diepoxide) or polyol (e.g., diol) to the reactive melt-processing mixture.

In another aspect, the disclosure relates to a thermally reversibly crosslinked (TRC) polyolefin formed by any of the methods disclosed herein according to their various embodiments and refinements.

In another aspect, the disclosure relates to a thermally reversibly crosslinked (TRC) polyolefin comprising: polyolefin chains; and reversible crosslinkers forming crosslinks between the polyolefin chains. The polyolefins and reversible crosslinkers, including their grafting agent moiety and crosslinking moiety components, can have the same embodiments as and refinements as described herein.

In another aspect, the disclosure relates to a method for recycling a thermally reversibly crosslinked (TRC) polyolefin, the method comprising: melt-processing (e.g., extruding) a thermally reversibly crosslinked (TRC) polyolefin according to any of its variously disclosed embodiments and refinements. This reflects the ability to thermally re-process a TRC-PO into a new shape or article, for example after having been recycled or recovered from a plastics waste stream. The method step is simply "melt-processing" instead of "reactive melt-processing," because the reversible crosslinkers have been previously grafted onto the PO chains to create the thermally reversible crosslinks. The application of heat, combined with the secondary amino groups, internal acid catalysts, Lewis acid catalyst, Brønsted acid catalyst, external catalyst, etc. already present in the TRC-PO (i.e., in admixture therewith or chemically bound thereto) can activate the dynamic equilibrium for the reversible crosslinks that allows the TRC-PO to be melt processed, after which the more stable, more static crosslinks re-form upon cooling to normal use temperatures. In some embodiments, however, it can be desirable to add fresh catalysts that are not otherwise incorporated into the TRC-PO structure, for example Lewis acid catalyst, Brønsted acid catalyst, external catalyst, etc.

The TRC-PO product can be used in a variety of applications, whether for a TRC-PO product formed from a fresh/virgin PO feedstock (e.g., reactive melt-processing), from a recycled PO feedstock (e.g., reactive melt-processing), or from a recycled TRC-PO feedstock (e.g., melt-reprocessing). For example, the obtained TRC-PO product is suitable for use in a variety of applications such as construction, automotive, and manufacturing. In addition, the TRC-PO product can be used to form a powder-based coating on a substrate, for example by crushing or otherwise forming the TRC-PO into a powder, applying or dispensing powered TRC-PO on a substrate, and then heating the TRC-PO powder to melt-process and form the resulting TRC-PO film or coating on the substrate. The TRC-PO product also can be used in a 3D printing or other additive manufacturing process printing, for example by forming the TRC-PO into filaments, and then using the filaments in a melt-processing 3D printer or additive manufacturing apparatus to form mechanically robust and solvent-resistant articles.

Various refinements of the disclosed method and thermally reversibly crosslinked polyolefin (TRC-PO) are possible.

In a refinement, the polyolefin (PO) comprises polyethylene and/or polypropylene. The polyolefin is not particularly limited and can include polymers (e.g., homopolymers, copolymers) formed from olefinic or alkene monomers (e.g., alpha-olefin monomers) such as ethene, propene, 1-butene, 1-pentene, 1-hexene, etc., which are typically used in a variety of commodity thermoplastic materials. Common thermoplastic polyolefins can include polyethylenes (PE) such as low-density polyethylene (LDPE), linear low-density polyethylene (LLDPE), very-low-density polyethylene (VLDPE), ultra-low-density polyethylene (ULDPE), or medium-density polyethylene (MDPE), polypropylene (PP), polymethylpentene (PMP), polybutene-1 (PB-1), ethylene-octene copolymers, stereo-block PP, olefin block copolymers, propylene-butane copolymers, metallocene polymers, etc. Examples of common polyolefin elastomers include polyisobutylene (PIB), poly(alpha-olefins), ethylene propylene rubber (EPR), ethylene propylene diene monomer (M-class) rubber (EPDM rubber), etc. In some embodiments, the polyolefin can be from a recycled and/or an otherwise post-consumer or post-industrial polyolefin feedstock. For example, the polyolefin can be a recycled polyolefin containing at least 90, 95, 98, or 99 wt. % and/or up to 99 or 100 wt. % of PE (e.g., one or more types), PP, or PE and PP. In some embodiments, the polyolefin can be a pristine or newly formed feedstock that is transformed into a TRC polyolefin prior to its first industrial, consumer, engineering, etc. application. In some embodiments, the polyolefin can include homopolymers or copolymers of the foregoing monomers, such as block, random, or graft copolymers, for example including pendant groups along the carbon-carbon backbone of the PO or TRC-PO (e.g., oligo- or poly-styrene chains).

In a refinement, the initiator comprises a peroxide free-radical initiator. The initiator is not particularly limited and can include free-radical initiators known in the art, for example organic peroxides, inorganic peroxies, and azo compounds. Example peroxide free-radical initiators include di(tert-butylperoxy)-3,3,5-trimethylcyclohexane and dicumyl peroxide, 2,5-Bis(tert-butylperoxy)-2,5-dimethylhexane (e.g., LUPEROX 101), 1,1-Bis(tert-butylperoxy)-3,3,5-trimethylcyclohexane 92% (LUPEROX 231), tert-butyl hydroperoxide, tert-butyl peracetate, benzoyl peroxide, di-tert-butyl peroxide, etc. While one can choose from the any know free-radical intiator sources, more preferable are those initiators that have a half-life of about 2 to 20 minutes at elevated temperatures, for example at reactive melt-processing temperatures such as above 100° C. The initiator is suitably added to the reactive melt-processing mixture in an amount of 0.01-10 wt. % or 0.1-1 wt. % (e.g., based on the polyolefin). The initiator can remain in residual corresponding amounts in the TRC-PO product.

In a refinement, the grafting agent moiety comprises a 5-membered ring structure, a 6-membered ring structure, or a ring-opened analog thereof (e.g., difunctional analog).

The 5- and 6-membered ring structure can be unsaturated. The ring structure includes carbon atoms and typically also includes one or more N or O heteroatoms, for example 1, 2, or 3 N or O heteroatoms. For example, in some embodiments, the ring structure can include an unsaturated C=C bond that can participate in the free-radical grafting reaction between the grafting agent moiety (or grafting agent more generally) and the polyolefin backbone, such as in a maleic anhydride-based or maleimide-based grafting agent moiety. In other embodiments, the ring structure is unsaturated (e.g., including only C—C, C-heteroatom, or heteroatom-heteroatom single bonds in the ring), but it can include or exclude unsaturated C=C functional groups as part of the grafting agent moiety more generally. For example, a cyclic itaconic anhydride has a 5-membered saturated ring (with 4 carbon and 1 oxygen atoms), but it has a pendant C=C functional group that can participate in the free-radical grafting reaction. Alternatively, a cyclic TEMPO nitroxide has a 6-membered saturated ring (with 5 carbon and 1 nitrogen atoms) that can be free from pendant C=C functional groups, but its N—O· nitroxide group as part of the TEMPO ring can similarly participate in the free-radical grafting reaction with the polyolefin backbone.

In addition to the cyclic 5- and 6-membered ring structure, the grafting agent moiety can include a ring-opened analog of the ring structure. For example, common ring structures of the grafting agent can include oxygen atoms as part of an anhydride group or nitrogen atoms as part of an imide group. In such cases, the ring-opened analog can include hydroxy, alkoxy, and/or amino groups at or attached to each of the ring-opened carbonyl atoms to provide two corresponding carboxylic, ester, or amide groups in the ring-opened analog. Such ring-opened analogs include two carbonyl carbon atoms joined by a linking group with 2 or 3 atoms (e.g., carbon atoms with optionally 1 or 2 N or O heteroatoms) and an unsaturated C=C bond (e.g., along/within the linking group pendant thereon). Illustrative ring and ring-opened analog structures are shown below, where the various R substituents can include alkyl and/or aryl groups with 1-12 or 2-6 carbon atoms. The top left structure can be maleic anhydride or derivative thereof (i.e., when X is O), or maleimide or derivative thereof (i.e., when X is NRY). The bottom left structure illustrates the ring-opened analog of the top left structure, with X and X' representing the two carboxylic, ester, or amide groups in the ring-opened analog corresponding to the original anhydride or imide group. The bottom right structure similarly illustrates a ring-opened analog structure resulting from an itaconic anhydride ring structure.

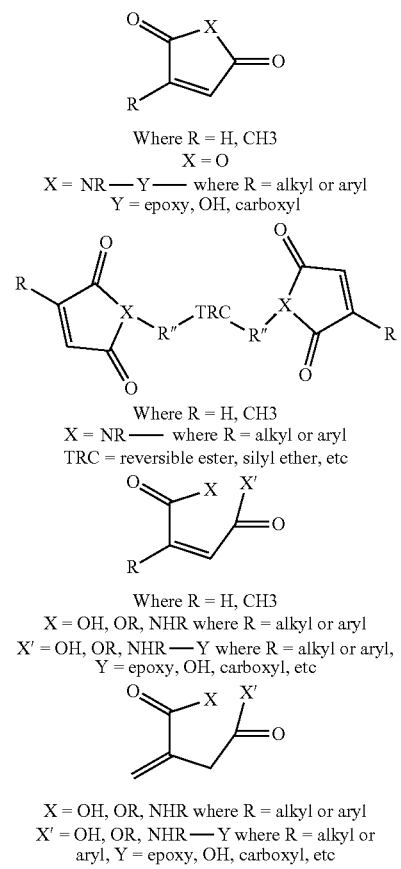

In a refinement, the grafting agent moiety comprises an unsaturated cyclic anhydride moiety. Suitable unsaturated cyclic anhydrides can include substituted and unsubstituted anhydrides of dicarboxylic acids containing a —C(=O)OC(=O)— group. Examples of suitable unsaturated cyclic anhydrides include maleic anhydride, itaconic anhydride, cis-glutaconic anhydride, citraconic anhydride, etc. A general unsaturated cyclic anhydride can be represented by $R^1C(=O)OC(=O)$, where $R^1$ includes at least two atoms (e.g., carbon atoms) linking the two carbonyl carbon atoms in a cyclic structure and at least one (or only one) unsaturated C=C group as part of the cyclic structure, whether as part of the ring or pendant on the ring. For example, $R^1$ can have 2, 3, 4, 5, or 6 carbon atoms and optionally one or more N or O heteroatoms, for example 1, 2, or 3 N or O heteroatoms, which carbon and/or heteroatoms can be unsubstituted (with H) or substituted (with other than H). Suitably, 2, 3, 4, or 5 of the carbon and/or heteroatoms in $R^1$ can be those linking the two carbonyl carbon atoms in the cyclic structure. As discussed above, the unsaturated C=C functional group that can participate in the free-radical grafting reaction with the polyolefin backbone can be part of the cyclic ring structure (e.g., as in maleic anhydride) or pendant from the cyclic ring structure (e.g., as in itaconic anhydride). The unsaturated cyclic anhydrides are particularly useful because the unsaturated cyclic structure resists undesirable homopolymerization, instead favoring the desired free-radical addition reaction with the polyolefin backbone. The unsaturated cyclic anhydrides are also useful because hydrolysis and ring-opening of the anhydride by reaction with a polyol, polyepoxide, etc. can create both an ester crosslinking bond as part of the reversible crosslinking system as well as a free carboxylic acid group, which can serve as an internal catalyst for transesterification in some TRC-PO systems. As discussed above, the cyclic grafting agent moiety can include ring-opened analogs of its ring counterparts, such as an unsaturated diacid, diester, or diamide corresponding to the foregoing unsaturated cyclic anhydrides. For example, maleic acid as a ring-opened diacid analog to maleic anhydride could be used a grafting agent moiety that can graft to the polyolefin backbone, react to form an ester bond as part of the crosslink, and retain a free pendant acid group (e.g., as an internal catalyst).

In a refinement, the grafting agent moiety comprises an unsaturated cyclic imide moiety. Suitable unsaturated cyclic imides can include substituted and unsubstituted imides containing a —C(=O)NR$^2$C(=O)— group. Examples of suitable unsaturated cyclic imides include maleimide and other imide analogs corresponding to an unsaturated cyclic anhydride (e.g., as described above) converted to an imide by reaction with a suitable amine (e.g., NH$_2$R$^2$), etc. A general unsaturated cyclic anhydride can be represented by R$^1$C(=O)NR$^2$C(=O), where R$_1$ includes at least two atoms (e.g., carbon atoms) linking the two carbonyl carbon atoms in a cyclic structure and at least one (or only one) unsaturated C=C group as part of the cyclic structure. R$^1$ can have the same options as above for the unsaturated cyclic anhydrides. As discussed above, the unsaturated C=C functional group that can participate in the free-radical grafting reaction with the polyolefin backbone can be part of the cyclic ring structure (e.g., as in maleimide). The unsaturated cyclic imides are particularly useful because the unsaturated cyclic structure resists undesirable homopolymerization, instead favoring the desired free-radical addition reaction with the polyolefin backbone. The unsaturated cyclic imides are also useful because the pendant R$^2$ group in the imide can include the crosslinking moiety, for example a hydrocarbon linker with pendant silyl ether groups for condensation crosslink formation and optionally with a secondary nitrogen atom to provide a thermally reversible crosslink in some TRC-PO systems. More generally, imides such as maleimide will bear functional groups such as OH (e.g., as in N-(2-hydroxyethyl)maleimide), COOH (e.g., as in 6-maleimidohexanoic acid), and epoxy (e.g., as in N-(2-epoxyethyl)maleimide), etc. As discussed above, the grafting agent moiety can include ring-opened analogs of its ring counterparts, such as an unsaturated diacid, diester, or diamide corresponding to the foregoing unsaturated cyclic imides.

In a refinement, the grafting agent moiety comprises a cyclic nitroxide (e.g., TEMPO). The cyclic nitroxide can provide dual functionality: It can be used itself as the grafting agent for the crosslinking moiety (e.g., using a crosslinking moiety-functionalized TEMPO), and it can be used to increase grafting efficiency of the unsaturated non-homopolymerizable monomers (e.g., unsaturated cyclic anhydrides or imides). In addition to the TEMPO group, the cyclic nitroxide more generally can include any nitroxide radical that does not itself initiate any free radical polymerization of the monomer. In some embodiments, the nitroxide can be TEMPO (i.e., a 6-member ring). In other embodiments, the nitroxide can be in a structure without a ring, but still with an N—O· group (i.e. radical on oxygen atom) In the illustrative structure below, the R groups can independently have 2-12 carbon atoms as separate groups or collectively have 2-12 carbon atoms in a cyclic aliphatic structure (e.g., as in TEMPO), which can be further substituted with a group bearing a linking functional group (e.g., hydroxy, epoxy, carboxylic) and a crosslinking moiety such as the R$^2$ group described above for the unsaturated cyclic imide.

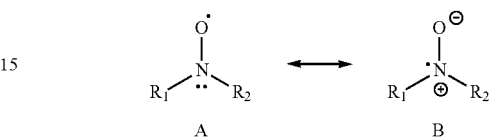

In a refinement, the crosslinking moiety comprises a silyl ether group. The crosslinking moiety can include silyl ether or alkoxy silane groups that can form crosslinks between polyolefin chains via condensation to form corresponding siloxane crosslinks. For example, crosslinking moiety can include silyl ether or alkoxy silane groups of the general form —SiOR (e.g., such as where R is ethyl or methyl) so that condensation reactions between neighboring —OR alkoxy groups (e.g., ethoxy, methoxy) can form corresponding —Si—O—Si— crosslinks between polyolefin chains. In an embodiment, the crosslinking moiety can be represented by —R$^4$—Si(OR$^5$)$_x$(R$^6$)$_y$, where x is 1, 2, or 3 and x+y=3. The crosslinking moiety can correspond to R$^2$ as described above for the unsaturated cyclic imide as the grafting agent moiety. For example, the reversible crosslinker can be represented by [grafting agent moiety-]—R$^4$—Si(OR$^5$)$_x$(R$^6$)$_y$, where the grafting agent moiety can be in the various embodiments described above and linked to the crosslinking moiety via the R$^4$ group. R$^4$ can have at least 2, 3, 4, 5, or 6 and/or up to 6, 8, 10, 12, 15, or 20 carbon atoms and optionally one or more N, O, or S heteroatoms, for example 1, 2, or 3 N, O, or S heteroatoms, which carbon and/or heteroatoms can be unsubstituted (with H) or substituted (with other than H). R$^4$ can include suitable linking groups to the grafting agent moiety, for example an ester or amide group. In an embodiment, R$^4$ includes at least one (or only one) secondary amino group (R—NH—R'). For example, R$^4$ can be represented by —R$^{4A}$—NH—R$^{4B}$—, where R$^{4A}$ links to the grafting agent moiety and R$^{4B}$ links to the silicon atom in the crosslinking moiety. R$^{4A}$ and R$^{4B}$ independently can have 2, 3, 4, 5, or 6 carbon atoms and optionally one or more N, O, or S heteroatoms, for example 1, 2, or 3 N, O, or S heteroatoms, which carbon and/or heteroatoms can be unsubstituted (with H) or substituted (with other than H). R$^5$ and R$^6$ independently can be substituted or unsubstituted alkyl groups with 1, 2, 3, 4, 5, or 6 carbon atoms.

In a further refinement with the silyl ether group, the crosslinking moiety further comprises a secondary amino group. The option including a secondary amino group (R—NH—R') is described above. In embodiments where the crosslinking moiety includes the silyl ether group but not a secondary amino group, the melt-processed mixture (and the final TRC-PO polymer) suitably includes one or more of a Lewis acid, a Brønsted acid, or a boronic ester to improve melt re-processability.

In a further refinement with the silyl ether group, the melt-processed mixture further comprises at least one of a Lewis acid catalyst and a Brønsted acid catalyst. Catalyst-assisted silyl ethers (e.g., without a secondary amine) can also behave reversibly. Suitable catalysts include Lewis acids (e.g., Zn(OTf)$_2$ and Sc(OTf)$_3$) and Brønsted (e.g., camphor sulfonic acid, CSA), although other Lewis and Brønsted acids known in the art are suitable. The catalysts can be included in the melt-processed mixture in an amount of about 5 mol. % (relative to silyl ether groups), for example about 0.01-20 wt. % or mol. %, or 1-5 wt. % or mol. %, relative to the weight or number of crosslinking moieties (silyl ether groups). Alternatively or additionally, the catalysts can be included in the melt-processed mixture in an amount of 0.01-5 wt. % or 0.1-2 wt. %, relative to the weight of the polyolefins. As amines can deactivate Lewis acids, such Lewis acid catalysts are preferably used when the crosslinking moiety does not a secondary amino group. Similarly, Brønsted acids are preferably used when the crosslinking moiety does not a secondary amino group. When included, the Lewis and/or Brønsted acids remain in the final TRC-PO product to permit repeated thermal re-processing.

In a further refinement with the silyl ether group, the melt-processed mixture further comprises a boronic compound. Silyl ether (Si—O—Si) linkages without secondary amines in the TRC-PO product undergo reversible crosslinking with boronic acids, which allow subsequent melt-reprocessing, thus creating extrudable vitrimers. Some examples of these boronic compounds include monoboronic acid (e.g., boronic acid), diboronic acid (e.g., 9,9-Didodecylfluorene-2,7-diboronic acid), etc. The boronic compound can be included in the melt-processed mixture in an amount of 0.01-10 wt. %, 0.1-5 wt. %, or 0.1-2 wt. %, relative to the weight of the polyolefins. When included, the boronic compound remains in the final TRC-PO product to permit repeated thermal re-processing.

In a refinement, the TRC-PO vitrimers incorporate a low-surface energy component, for example a siloxane such as a polysiloxane (e.g., polydimethyl siloxane or PDMS). The siloxane can be part of the TRC crosslinker, for example being part of or bound to a silyl ether group as the crosslinker. In another embodiment, the siloxane can be grafted to the PO carbon-carbon backbone directly as a pendant group (i.e., not forming a crosslink with other PO chains), for example using a PDMS-maleimide or a PDMS-maleic acid/anhydride ester reaction product for grafting onto the PO backbone. In the latter case, the TRC-PO performance will be due to the linkers described above, while PDMS will impart only low surface energy.

In a refinement, the crosslinking moiety comprises an ester group. The ester group is not particularly limited. In an embodiment, the ester group can correspond to a reaction product of a polyepoxide (e.g., diepoxide) or a polyol (e.g., diol) with an acid group such as a carboxylic acid group formed by hydrolysis and ring-opening of an anhydride grafting agent (e.g., maleic anhydride), for example with replacement of one or more acid groups with alkoxy groups (e.g., a dialkyl maleate such as dimethyl or diethyl maleate). In addition to the grafting agent and polyepoxide/polyol, the ester reaction product can be formed with one or more additional acid- or anhydride-containing compounds, for example compounds with two or more anhydride groups, two or more carboxylic acid groups, and/or at least one sulfonic acid group. Hydrolysis and ring-opening of the anhydride groups can form an ester link and a sterically close carboxylic acid group as an internal transesterification acid catalyst. Carboxylic acid groups can form an ester link. Sulfonic acid groups can provide a sterically close acid group as an internal transesterification acid catalyst, for example when the sulfonic acid group is incorporated into a compound containing anhydride or carboxylic acid groups for ester formation. Suitable polyepoxides can include diepoxides having from 5 to 20 carbon atoms and two epoxide or oxirane groups (e.g., at opposing ends of a carbon chain). Suitable polyols can include diols having from 2 to 20 carbon atoms and two hydroxyl groups (at opposing ends of a carbon chain). Suitable co-reactants with additional anhydride, carboxylic acid, and/or sulfonic acid groups include pyromellitic dianhydride, 1,2,4,5-benzenetetracarboxylic acid, 1,2,4-benzenetricarboxylic acid, 1,2-(sulfonyl)benzoic acid, etc. Examples of suitable polyepoxides include diepoxy (e.g., poly(ethylene glycol) diglycidyl ether; 1,2,7,8-Diepoxyoctane), polyepoxy (e.g., poly(styrene-co-glycidyl methacrylate)), etc. Examples of suitable polyols include triols, such as polycaprolactone triol, glycerol ethoxylate-co-propoxylate triol and diols, for example diols with 2 to 12 carbon atoms, such as 1,2-ethanediol, 1,3-propanediol, 1,4-butanediol, 1,6-hexanediol, 1,4-hexanediol, 1,4-cyclohexanediol, 1,4-cyclohexanedimethylanol, 1,8-octanediol, and 1,10-decanediol.

In a further refinement with the ester group, the crosslinking moiety further comprises an internal transesterification acid catalyst. The internal transesterification acid catalyst is generally a carboxylic acid (—COOH) or sulfonic acid (—SO$_3$H) group that is sterically close to the ester group in the crosslinking moiety. The sterically close spatial relationship between the acid catalyst group and the ester group in turn promotes transesterification reactions, in particular at elevated temperatures suitable for initial melt processing and subsequent melt re-processing, thus providing the thermally reversible crosslinks in the TRC-PO. In embodiments where the crosslinking moiety includes the ester group but not an internal transesterification acid catalyst, the melt-processed mixture (and the final TRC-PO polymer) suitably includes an external catalyst.

In a further refinement with the ester group, the melt-processed mixture further comprises an external transesterification acid catalyst. The external catalyst can be included in the melt-processed mixture in an amount of 0.01-5 wt. % or 0.1-2 wt. %, relative to the weight of the polyolefins. When included, the external catalyst remains in the final TRC-PO product to permit repeated thermal re-processing. Examples of suitable external catalysts include zinc- and tin-based transesterification catalysts, for example zinc alkanoates (e.g., zinc acetate, zinc ethyl hexanoate, etc.) and organotin compounds (e.g., dibutyltin dilaurate or other alkanoates).

In a refinement, the melt-processed mixture contains the reversible crosslinker in a range from 0.5 mol. % to 40 mol. % relative to the polyolefin. Suitable molar ranges can be at least 0.5, 1, 2, 3, 5, or 10 mol. % and/or up to 3, 5, 8, 10, 12, 15, 20, 30, or 40 mol. %. The molar ranges can independently apply to any of the (i) the reversible crosslinker as a whole, (ii) the grafting agent (e.g., in embodiments where separately provided to form the reversible crosslinker in situ), and the (iii) the crosslinking moiety (e.g., in embodiments where separately provided to form the reversible crosslinker in situ). The mole ratio of grafting agent to TRC crosslinker is suitably in a range of 1:1 or 1:1.2 to 1:2 or 1:3, for example about 1:1.5 (i.e., excess of TRC crosslinking moiety).

In a refinement, the thermally reversibly crosslinked (TRC) polyolefin has a crosslinking density in a range from 0.5 mol. % to 40 mol. %. The TRC-PO suitably has a crosslinking density (or graft density) in a range from 0.5 mol. % to 40 mol. %, 1 mol. % to 20 mol. %, or 5 mol. % to 10 mol. %, for example at least 1, 2, 3, 5, 7, or 10 mol. % and/or up to 6, 8, 10, 12, 15, 20, 30, or 40 mol. %. The mole percent for crosslinking density represents the fraction of PO monomer units containing a grafted reversible crosslinker. For example, a TRC-PO based on PE with a crosslinking density of 10 mol. % has an average of one grafted reversible crosslinking unit (i.e., a backbone-bound grafting agent moiety) for every ten ethylene monomer units. In an embodiment, desirably high crosslinking densities can be obtained by 1) using of reversible radical capture agents (such as (TEMPO) and dithiocarbamyl) that allow more grafting without promoting C—C irreversible crosslinking, and 2) matching surface energies (such as use of functional maleimide with surface energies nearly similar that of polyolefins), which allows better mixing and thus higher grafting/crosslinking densities.

In a refinement, the thermally reversibly crosslinked (TRC) polyolefin is gel-free. An advantage of the TRC-PO is that it does not exhibit gelation at its desirably high crosslinking density. For example, a TRC-PO that is gel-free is melt-processable (and melt-reprocessable) without formation of significant polymer gel particles corresponding to (irreversible) crosslinks.

In a refinement, the melt-processed mixture further comprises an additive selected from the group consisting of rheology modifiers, co-agents, and combinations thereof. Examples of rheology modifiers includes, waxes, plant oils, low-MW (molecular weight) polyolefins (e.g., for a silyl ether system) or for transesterification system low-MW linear polyesters and polyolefins. Suitable MW ranges for such rheology modifiers include 200-5000 g/mol, and the rheology modifiers remain in admixture with the final TRC-PO (i.e., non-reactive). Example co-agents include donor molecules such as N,N'-ethylenebis(stearamide), dimethyl formamide (DMF), dimethyl acetamide, to suppress crosslinking in PE and suppress chain scission in PP. Butylated hydroxytoluene (BHT), dithiocarbamyl, as well as TEMPO or other nitroxide radical can be used as a co-agent to increase grafting density. The additives can be included individually or collectively in an amount of 0.01-20 wt. %, 0.1-10 wt. %, or 1-5 wt. %, relative to the weight of the PO or TRC-PO.

In a refinement, reactive melt-processing the mixture comprises reactively extruding the mixture. Any apparatus typically used for melt-processing of the PO polymers may be used, for example twin- and single-screw extrusion apparatus operated at a sufficiently high temperature to melt the base polyolefin material.

In a refinement, the method comprises: adding to the mixture a reversible crosslinker comprising the grafting agent moiety and the crosslinking moiety bound thereto. This represents an embodiment in which the reversible crosslinker is already formed when it is added to the reactive melt-processing mixture. For example, the reversible crosslinker can be an anhydride or imide grafting agent already including a pendant silyl ether/alkoxy silane group, which is then added to the polyolefin and initiator for grafting and formation of the TRC-PO.

In a refinement, the method comprises: adding to the mixture a grafting agent comprising the grafting agent moiety and a crosslinker, thereby forming the reversible crosslinker in situ during reactive melt-processing of the mixture. This represents an embodiment in which the reversible crosslinker is formed during reactive melt-processing by adding a grafting agent reactive with the polyolefin and crosslinker reactive with the grafting agent to the reactive melt-processing mixture. For example, maleic anhydride can be added as the grafting agent. A diepoxide can be added as crosslinker, to form crosslinking ester bonds capable of transesterification with an external catalyst. Alternatively or additionally, a diol and di- or polyahydride (e.g., pyromellitic dianhydride) can be added as crosslinkers to form crosslinking ester bonds capable of transesterification with the internal catalyst resulting from anhydride ring openings.

While the disclosed articles, apparatus, methods, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein:

FIG. 2 illustrates mechanisms by which thermally reversible bonds can operate in TRC-POs according to the disclosure.

FIG. 3 illustrates representative cyclic grafting agent moieties according to the disclosure.

FIG. 10 illustrates representative mechanisms for forming silyl ether-based reversible crosslinks according to the disclosure.

DETAILED DESCRIPTION

The disclosure relates to thermally reversibly crosslinked polyolefins (TRC-PO) and methods for making the same. A TRC-PO can be formed by reactive melt-processing a mixture including (i) a polyolefin, (ii) an initiator, and (iii) a reversible crosslinker. The reversible crosslinker includes (A) a grafting agent moiety selected from unsaturated cyclic anhydrides, unsaturated cyclic imides, cyclic nitroxides, and ring-opened analogs thereof, and (B) a crosslinking moiety bound to the grafting agent moiety. This reactive melt-processing, for example including reactive extrusion, forms a thermally reversibly crosslinked (TRC) polyolefin with polyolefin chains reversibly crosslinked via the reversible crosslinkers, which provide dynamic covalent bonds, such as siloxanes and esters, that are amenable to melt re-processing to re-from or otherwise re-use the TRC-PO while still retaining the reversible crosslinks after re-processing. Catalysts and additives such as rheology modifiers can be added to the melt-processing mixture.

Figure 1:
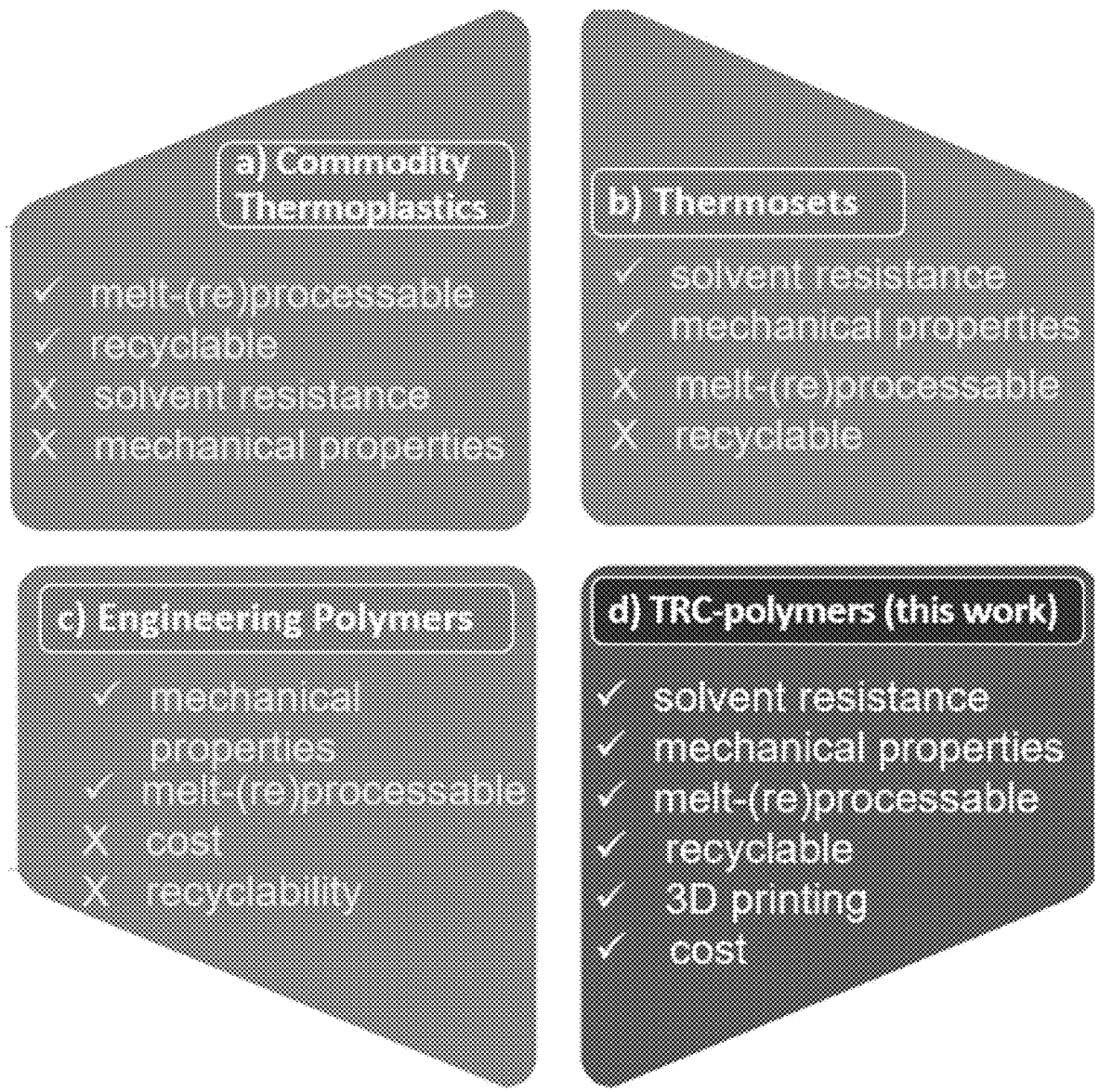
FIG. 1 is a schematic comparing thermally reversibly crosslinked (TRC) polymers according to the disclosure with conventional thermoplastics, thermosets, and engineering polymers.

The disclosure promotes environmentally responsible solutions for the challenges posed by the excessive use of plastics and focuses on developing new polymer reaction processes that promote sustainable manufacturing and end of life processing for polymers. As discussed above and as illustrated in FIG. 1, conventional commodity thermoplastics, thermosets, and engineering polymers includes combinations of advantages and disadvantages, which in turn limit their use in some applications, prevent them from being recycled/reused in many cases, and contribute to the currently non-sustainable practice of landfilling or incineration about 91% of polymer-based materials after use. To overcome the several shortcomings of the existing polymeric materials in terms of performance and sustainability, the disclosure focuses on methods and reaction engineering processes to create thermally reversible crosslinked (TRC) polymers. These TRC polymers can be generated using legacy polyethylene (PE), PP, and blends of polyolefins (POs), which exhibit the high performance of conventional thermosets and engineering polymers, while still retaining the processability of commodity thermoplastics (FIG. 1). Thus, the TRC-POs according to the disclosure collectively incorporate the otherwise disparate strengths of commodity thermoplastics, thermosets, and engineering polymers to provide new materials capable of having a combination of good mechanical, chemical, physical, and/or omniphobic properties while retaining their melt-(re)processability to provide low-cost, recyclable, re-usable, and sustainable polymer materials.

The TRC-POs according to the disclosure provide several advantages, including: (1) methods to create gel-free TRC polymers (e.g., TRC-PE, TRC-PP, and TRC-POs) with tailorable crosslinking densities; (2) techniques for precise control of TRC-PO performance by changing the nature of the crosslinker; (3) enabling repeatable melt-(re)processing of TRC-POs using industrially relevant extrusion processes while avoiding chemical degradation; and (4) providing TRC-POs as a class of materials that leverages the strengths of commodity thermoplastics, engineering polymers, and thermosets to provide sustainable materials. The disclosure provides processing strategies to transform legacy PE, PP, and other POs into their respective TRC-polymers (TRC-PE, TRC-PP, and TRC-POs) with advantageous properties similar to those of conventional thermosets and engineering polymers, while still retaining the processability of conventional thermoplastics. The TRC-POs contribute to sustainable manufacturing by offering recyclable, low-cost, and superior performing versatile TRC-polymers. Reactive extrusion (REX) can be used to provide gel-free TRC-POs, for example TRC-PE with tailorable crosslinking densities from neat HDPE. Similarly, REX approaches can be applied to provide gel-free TRC-PP from neat isotactic PP TRC-POs from a mixture of PP and PE (e.g., HDPE, low density PE (LDPE), linear low density PE (LLDPE)). A combination of variables such as the nature and amount of reversible crosslinkers, additives and catalysts can be selected to obtain TRC-POs with tunable performance (e.g., solvent resistant, creep resistant, superior mechanical properties, repeatable melt-(re)processability without chemical degradation) comparable to those of commercial thermosets and engineering polymers benchmarks.

The TRC-POs can be used in automobiles, construction, infrastructure, and in additive manufacturing. For example, additive manufacturing processes can benefit from TRC-POs that exhibit enhanced performance and interlayer adhesion. Sustainable manufacturing can be improved by using TRC-POs as they are amenable to re/upcycling for manufacturing applications in electronics (e.g., where high thermal stability is required). The TRC-POs can be used as feedstocks for high-performance composites as they can provide blends with the combined features of crosslinkability and melt-(re)processability, thus offering a great degree of control over phase separation (e.g., crosslinking suppresses phase separation). The TRC-POs according to the disclosure have melt-(re)processable crosslinked structures which are currently non-existent.

Polymers with carbon-carbon backbones (e.g., PE and PP) are non-biodegradable, and they account for over 75% of the total polymers used today. For example, current global production of PE (LLDPE, LDPE, and HDPE) exceeds 180 million tons/year, accounting for >45% of all the polymers generated. PE is one of the most inexpensive polymers available. However, PE is only suitable for moderate temperature applications such as packaging. PE degrades at high temperatures and has low solvent resistance, which makes it an unsuitable alternative for thermosets (e.g., epoxy esters) or engineering polymers (e.g., polycarbonates). Accordingly, the TRC-POs according to the disclosure provide methods to tailor the properties of PE and other POs such that they remain melt-(re)processable, but become suitable for applications typically reserved for thermosets and engineering polymers, thus providing substantial environmental, economic, and technical benefits. FIG. 2 qualitatively illustrates mechanisms by which thermally reversible bonds can operate in TRC-POs according to the disclosure for the representative cases of PE as the base resin incorporating either (A) silyl ether crosslinking groups or (B) ester crosslinking groups. At high temperatures, TRC-PE can exhibit melt-flow like thermoplastics, while behaving in a similar manner as conventional thermosets and engineering polymers at temperatures below their vitrimeric temperature ($T_v$). Below their $T_v$, the dynamic bond exchange is frozen due to the stable crosslinked structures (FIG. 2). The nature and amount of the crosslinkers as well as catalysts can be selected to control the service temperature of the TRC-PE or other TRC-POs (i.e., the lowest and/or highest temperatures that a product can withstand during the time it is applied to a substrate).

Polyolefin

The polyolefin (PO) can include common thermoplastics such as polyethylene (PE) and/or polypropylene (PP), but it more generally can include other polymers with a carbon-carbon backbone, for example -[—$CR_2$—$CR_2$—]- repeat units where the R groups on the backbone independently can be hydrogen atoms, alkyl groups, or other substituents).

The polyolefin is not particularly limited and can include polymers (e.g., homopolymers, copolymers) formed from olefinic or alkene monomers (e.g., alpha-olefin monomers) such as ethene, propene, 1-butene, 1-pentene, 1-hexene, etc., which are typically used in a variety of commodity thermoplastic materials. Common thermoplastic polyolefins can include polyethylenes (PE) such as low-density polyethylene (LDPE), linear low-density polyethylene (LLDPE), very-low-density polyethylene (VLDPE), ultra-low-density polyethylene (ULDPE), or medium-density polyethylene (MDPE), polypropylene (PP), polymethylpentene (PMP), polybutene-1 (PB-1), ethylene-octene copolymers, stereoblock PP, olefin block copolymers, propylene-butane copolymers, metallocene polymers, etc. Examples of common polyolefin elastomers include polyisobutylene (PIB), poly(alpha-olefins), ethylene propylene rubber (EPR), ethylene propylene diene monomer (M-class) rubber (EPDM rubber), etc. In some embodiments, the polyolefin can be from a recycled and/or an otherwise post-consumer or post-industrial polyolefin feedstock. For example, the polyolefin can be a recycled polyolefin containing at least 90, 95, 98, or 99 wt. % and/or up to 99 or 100 wt. % of PE (e.g., one or more types), PP, or PE and PP. In some embodiments, the polyolefin can be a pristine or newly formed feedstock that is transformed into a TRC polyolefin prior to its first industrial, consumer, engineering, etc. application. In some embodiments, the polyolefin can include homopolymers or copolymers of the foregoing monomers, such as block, random, or graft copolymers, for example including pendant groups along the carbon-carbon backbone of the PO or TRC-PO (e.g., oligo- or poly-styrene chains).

The PO can be present in the TRC-PO or in the admixture of components combined to form the TRC-PO in a wide range of amounts, for example depending on the degree of crosslinking to be incorporated into the TRC-PO, whether further additives (e.g., fillers, PDMS or other omniphobic additives, etc.) are incorporated into the TRC-PO, etc. In some embodiments, the PO is present or added in an amount of 60-98 wt. % or 50-99 wt. % relative to the TRC-PO or the corresponding reactive melt-processing mixture used to form the TRC-PO. For example, the PO can be present in amount of at least 50, 60, 70, 80, 90, or 95 wt. % and/or up to 70, 80, 90, 92, 94, 96, 98, or 99 wt. %. The foregoing ranges can apply to all POs present in the reactive melt-processing mixture or corresponding TRC-PO, for example when a blend of multiple different POs is used as a feedstock to form the TRC-PO (e.g., blend of PE and PP, blend of different types of PE, etc.).

Initiator

The initiator is suitably a peroxide free-radical initiator. The initiator is not particularly limited, however, and can generally include any free-radical initiators known in the art, for example organic peroxides, inorganic peroxies, and azo compounds. Example peroxide free-radical initiators include di(tert-butylperoxy)-3,3,5-trimethylcyclohexane and dicumyl peroxide, 2,5-Bis(tert-butylperoxy)-2,5-dimethylhexane (e.g., LUPEROX 101), 1,1-Bis(tert-butylperoxy)-3,3,5-trimethylcyclohexane 92% (LUPEROX 231), tert-butyl hydroperoxide, tert-butyl peracetate, benzoyl peroxide, di-tert-butyl peroxide, etc. While one can choose from the any know free-radical intiator sources, more preferable are those initiators that have a half-life of about 2 to 20 minutes at elevated temperatures, for example at reactive melt-processing temperatures such as above 100° C. The initiator is suitably added to the reactive melt-processing mixture in an amount of 0.01-10 wt. % or 0.1-1 wt. %, for example expressed relative to the reactive melt-processing mixture used to form the TRC-PO or expressed relative to the PO component(s) thereof. For example, the initiator can be present in amount of at least 0.01, 0.02, 0.05, 0.1, 0.2, or 0.4 wt. % and/or up to 0.3, 0.4, 0.6, 0.8, 1, 2, 4, 6, or 10 wt. %. The initiator can remain in residual corresponding amounts in the TRC-PO product.

Reversible Crosslinker

The reversible crosslinker generally includes a grafting agent moiety or component and a crosslinking moiety or component bound to the grafting agent moiety. As described in more detail below, the grafting agent moiety (also referenced as "grafting agent" herein) includes one or more chemical functional groups for grafting the reversible crosslinker onto the base or backbone PO chains to be converted into a TRC-PO. Similarly, the crosslinking moiety (also referenced as "crosslinker" herein) includes one or more chemical functional groups for forming crosslinks between other PO chains in the final TRC-PO, for example by reaction with other crosslinker or grafting agent moieties. In embodiments, the melt-processed mixture contains the reversible crosslinker in a range from 0.5 mol. % to 40 mol. % relative to the polyolefin. Suitable molar ranges can be at least 0.5, 1, 2, 3, 5, or 10 mol. % and/or up to 3, 5, 8, 10, 12, 15, 20, 30, or 40 mol. %. The mole percent for reversible crosslinker can represent the fraction of PO monomer units containing a grafted reversible crosslinker. The molar ranges can independently apply to any of the (i) the reversible crosslinker as a whole, (ii) the grafting agent, such as in embodiments where the grafting agent is separately provided to form the reversible crosslinker in situ, and/or the (iii) the crosslinking moiety, such as in embodiments where the crosslinking moiety is separately provided to form the reversible crosslinker in situ. The mole ratio of grafting agent to TRC crosslinker is suitably in a range of 1:1 or 1:1.2 to 1:2 or 1:3, for example about 1:1.5 (i.e., excess of TRC crosslinking moiety). In some embodiments, the reversible crosslinker is present or added in an amount of 0.2-40 wt. % or 1-20 wt. % relative to the TRC-PO or the corresponding reactive melt-processing mixture used to form the TRC-PO. For example, the reversible crosslinker can be present in amount of at least 0.2, 0.5, 1, 2, 5, 7, 10, 15, or 20 wt. % and/or up to 5, 8, 10, 15, 20, 25, 30, 35, or 40 wt. %. The foregoing ranges can apply to all reversible crosslinkers present in the reactive melt-processing mixture or corresponding TRC-PO, for example when a blend of multiple different reversible crosslinkers is used to form the TRC-PO.

The grafting agent or grafting agent moiety can be a cyclic grafting agent or moiety thereof, which can include unsaturated cyclic anhydrides, unsaturated cyclic imides, and cyclic nitroxides such as substituted or unsubstituted maleic anhydride, substituted or unsubstituted maleimide, or substituted or unsubstituted (2,2,6,6-tetramethylpiperidin-1-yl) oxidanyl ("TEMPO"). The grafting agent can include one compound or a mixture of compounds suitable for grafting, such as bismaleimide and maleic anhydride in combination. The disclosed TRC-PO is suitably formed using of a grafting agent like maleic anhydride as compared to a vinyl or alkenyl analog (e.g., $CH_2=CH-R$, where R includes linking moieties and/or crosslinking moieties) to improve grafting and avoid homopolymerization as an important benefit of the disclosed methods and compositions. Accordingly, grafting agents according to the disclosure preferentially react via free-radical addition to the polyolefin backbone (i.e., the desired product providing a thermally reversible crosslinking functionality to the polyolefin) instead of via self-polymerization (i.e., an undesired product tending to leave the polyolefin with a lower degree of thermally reversible crosslinking functionality). Reversible crosslinking groups appended to the polyolefin backbone via the grafting agent are not particularly limited, but suitable examples include silyl ethers with and without secondary amino groups, esterification links with internal or external transesterification catalyst, etc.

The reversible crosslinker can be already formed when it is added to the reactive melt-processing mixture, for example as an anhydride or imide grafting agent already including a pending silyl ether/alkoxy silane group. Alternatively, the reversible crosslinker can be formed in situ during reactive melt-processing by adding a grafting agent reactive with the polyolefin and crosslinker reactive with the grafting agent to the reactive melt-processing mixture, for example separately adding maleic anhydride and a polyepoxide (e.g., diepoxide) or polyol (e.g., diol) to the reactive melt-processing mixture.

Examples of suitable grafting agent moieties, crosslinking moieties, reversible crosslinkers, and representative reactions in the reversible crosslinking process are described in more detail below.

In embodiments, the grafting agent moiety can include a 5-membered ring structure, a 6-membered ring structure, or a ring-opened analog thereof, for example difunctional analog of the ring structure after ring-opening. The 5- and 6-membered ring structure can be unsaturated. The ring structure includes carbon atoms and typically also includes one or more N or O heteroatoms, for example 1, 2, or 3 N or O heteroatoms. For example, in some embodiments, the ring structure can include an unsaturated C=C bond that can participate in the free-radical grafting reaction between the grafting agent moiety (or grafting agent more generally) and the polyolefin backbone, such as in a maleic anhydride-based or maleimide-based grafting agent moiety. In other embodiments, the ring structure is unsaturated (e.g., including only C—C, C-heteroatom, or heteroatom-heteroatom single bonds in the ring), but it can include or exclude unsaturated C=C functional groups as part of the grafting agent moiety more generally. For example, a cyclic itaconic anhydride has a 5-membered saturated ring (with 4 carbon and 1 oxygen atoms), but it has a pendant C=C functional group that can participate in the free-radical grafting reaction. Alternatively, a cyclic TEMPO nitroxide has a 6-membered saturated ring (with 5 carbon and 1 nitrogen atoms) that can be free from pendant C=C functional groups, but its N—O· nitroxide group as part of the TEMPO ring can similarly participate in the free-radical grafting reaction with the polyolefin backbone.

In addition to the cyclic 5- and 6-membered ring structure, the grafting agent moiety can include a ring-opened analog of the ring structure. For example, common ring structures of the grafting agent can include oxygen atoms as part of an anhydride group or nitrogen atoms as part of an imide group. In such cases, the ring-opened analog can include hydroxy, alkoxy, and/or amino groups at each of the ring-opened carbonyl atoms to provide two corresponding carboxylic, ester, or amide groups in the ring-opened analog. Such ring-opened analogs include two carbonyl carbon atoms joined by a linking group with 2 or 3 atoms (e.g., carbon atoms with optionally 1 or 2 N or O heteroatoms) and an unsaturated C=C bond (e.g., along/within the linking group pendant thereon). Illustrative ring and ring-opened analog structures are shown in FIG. 3, where the various R substituents can include alkyl and/or aryl groups with 1-12 or 2-6 carbon atoms. In FIG. 3, the top left structure can be maleic anhydride or derivative thereof (i.e., when X is O), or maleimide or derivative thereof (i.e., when X is NRY). The bottom left structure illustrates the ring-opened analog of the top left structure, with X and X' representing the two carboxylic, ester, or amide groups in the ring-opened analog corresponding to the original anhydride or imide group. The bottom right structure similarly illustrates a ring-opened analog structure resulting from an itaconic anhydride ring structure.

In embodiments, the grafting agent moiety includes an unsaturated cyclic anhydride moiety. Suitable unsaturated cyclic anhydrides can include substituted and unsubstituted anhydrides of dicarboxylic acids containing a —C(=O)OC (=O)— group. Examples of suitable unsaturated cyclic anhydrides include maleic anhydride, itaconic anhydride, cis-glutaconic anhydride, citraconic anhydride, etc. A general unsaturated cyclic anhydride can be represented by $R^1C(=O)OC(=O)$, where $R^1$ includes at least two atoms (e.g., carbon atoms) linking the two carbonyl carbon atoms in a cyclic structure and at least one (or only one) unsaturated C=C group as part of the cyclic structure, whether as part of the ring or pendant on the ring. For example, $R^1$ can have 2, 3, 4, 5, or 6 carbon atoms and optionally one or more N or O heteroatoms, for example 1, 2, or 3 N or O heteroatoms, which carbon and/or heteroatoms can be unsubstituted (with H) or substituted (with other than H). Suitably, 2, 3, 4, or 5 of the carbon and/or heteroatoms in $R^1$ can be those linking the two carbonyl carbon atoms in the cyclic structure. As discussed above, the unsaturated C=C functional group that can participate in the free-radical grafting reaction with the polyolefin backbone can be part of the cyclic ring structure (e.g., as in maleic anhydride) or pendant from the cyclic ring structure (e.g., as in itaconic anhydride). The unsaturated cyclic anhydrides are particularly useful because the unsaturated cyclic structure resists undesirable homopolymerization, instead favoring the desired free-radical addition reaction with the polyolefin backbone. The unsaturated cyclic anhydrides are also useful because hydrolysis and ring-opening of the anhydride by reaction with a polyol, polyepoxide, etc. can create both an ester crosslinking bond as part of the reversible crosslinking system as well as a free carboxylic acid group, which can serve as an internal catalyst for transesterification in some TRC-PO systems. As discussed above, the cyclic grafting agent moiety can include ring-opened analogs of its ring counterparts, such as an unsaturated diacid, diester, or diamide corresponding to the foregoing unsaturated cyclic anhydrides. For example, maleic acid as a ring-opened diacid analog to maleic anhydride could be used a grafting agent moiety that can graft to the polyolefin backbone, react to form an ester bond as part of the crosslink, and retain a free pendant acid group (e.g., as an internal catalyst).

In embodiments, the grafting agent moiety can include an unsaturated cyclic imide moiety. Suitable unsaturated cyclic imides can include substituted and unsubstituted imides containing a —C(=O)NR$^2$C(=O)— group. Examples of suitable unsaturated cyclic imides include maleimide and other imide analogs corresponding to an unsaturated cyclic anhydride (e.g., as described above) converted to an imide by reaction with a suitable amine (e.g., NH$_2$R$^2$), etc. A general unsaturated cyclic anhydride can be represented by $R^1C(=O)NR^2C(=O)$, where $R_1$ includes at least two atoms (e.g., carbon atoms) linking the two carbonyl carbon atoms in a cyclic structure and at least one (or only one) unsaturated C=C group as part of the cyclic structure. $R^1$ can have the same options as above for the unsaturated cyclic anhydrides. As discussed above, the unsaturated C=C functional group that can participate in the free-radical grafting reaction with the polyolefin backbone can be part of the cyclic ring structure (e.g., as in maleimide). The unsaturated cyclic imides are particularly useful because the unsaturated cyclic structure resists undesirable homopolymerization, instead favoring the desired free-radical addition reaction with the polyolefin backbone. The unsaturated cyclic imides are also useful because the pendant R$^2$ group in the imide can include the crosslinking moiety, for example a hydrocarbon linker with pendant silyl ether groups for condensation crosslink formation and optionally with a secondary nitrogen atom to provide a thermally reversible crosslink in some TRC-PO systems. More generally, imides such as maleimide will bear functional groups such as OH (e.g., as in N-(2-hydroxyethyl)maleimide), COOH (e.g., as in 6-maleimidohexanoic acid), and epoxy (e.g., as in N-(2-epoxyethyl)maleimide), etc. As discussed above, the grafting agent moiety can include ring-opened analogs of its ring counterparts, such as an unsaturated diacid, diester, or diamide corresponding to the foregoing unsaturated cyclic imides.

Figure 4:
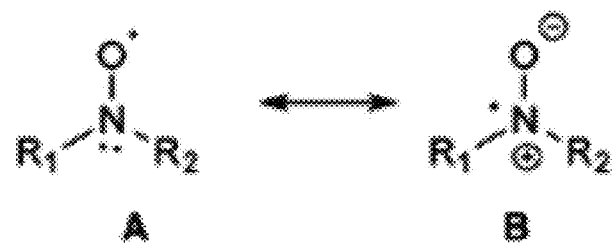
FIG. 4 illustrates a representative cyclic nitroxide structure as a grafting agent according to the disclosure.

In embodiments, the grafting agent moiety can include a cyclic nitroxide such as TEMPO. The cyclic nitroxide can provide dual functionality: It can be used itself as the grafting agent for the crosslinking moiety (e.g., using a crosslinking moiety-functionalized TEMPO), and it can be used to increase grafting efficiency of the unsaturated non-homopolymerizable monomers (e.g., unsaturated cyclic anhydrides or imides). In addition to the TEMPO group, the cyclic nitroxide more generally can include any nitroxide radical that does not itself initiate any free radical polymerization of the monomer. In some embodiments, the nitroxide can be TEMPO (i.e., a 6-member ring). In other embodiments, the nitroxide can be in a structure without a ring, but still with an N—O· group (i.e. radical on oxygen atom) In the illustrative cyclic nitroxide structure shown in FIG. 4, the R groups can independently have 2-12 carbon atoms as separate groups or collectively have 2-12 carbon atoms in a cyclic aliphatic structure (e.g., as in TEMPO), which can be further substituted with a group bearing a linking functional group (e.g., hydroxy, epoxy, carboxylic) and a crosslinking moiety such as the $R^2$ group described above for the unsaturated cyclic imide.

In embodiments, the crosslinking moiety can include a silyl ether group. The crosslinking moiety can include silyl ether or alkoxy silane groups that can form crosslinks between polyolefin chains via condensation to form corresponding siloxane crosslinks. For example, crosslinking moiety can include silyl ether or alkoxy silane groups of the general form —SiOR (e.g., such as where R is ethyl or methyl) so that condensation reactions between neighboring —OR alkoxy groups (e.g., ethoxy, methoxy) can form corresponding —Si—O—Si— crosslinks between polyolefin chains. In an embodiment, the crosslinking moiety can be represented by —$R^4$—Si($OR^5$)$_x$($R^6$)$_y$, where x is 1, 2, or 3 and x+y=3. The crosslinking moiety can correspond to $R^2$ as described above for the unsaturated cyclic imide as the grafting agent moiety. For example, the reversible crosslinker can be represented by [grafting agent moiety-]—$R^4$—Si($OR^5$)$_x$($R^6$)$_y$, where the grafting agent moiety can be in the various embodiments described above and linked to the crosslinking moiety via the $R^4$ group. $R^4$ can have at least 2, 3, 4, 5, or 6 and/or up to 6, 8, 10, 12, 15, or 20 carbon atoms and optionally one or more N, O, or S heteroatoms, for example 1, 2, or 3 N, O, or S heteroatoms, which carbon and/or heteroatoms can be unsubstituted (with H) or substituted (with other than H). $R^4$ can include suitable linking groups to the grafting agent moiety, for example an ester or amide group. In an embodiment, $R^4$ includes at least one (or only one) secondary amino group (R—NH—R'). For example, $R^4$ can be represented by —$R^{4A}$—NH—$R^{4B}$—, where $R^{4A}$ links to the grafting agent moiety and $R^{4B}$ links to the silicon atom in the crosslinking moiety. $R^{4A}$ and $R^{4B}$ independently can have 2, 3, 4, 5, or 6 carbon atoms and optionally one or more N, O, or S heteroatoms, for example 1, 2, or 3 N, O, or S heteroatoms, which carbon and/or heteroatoms can be unsubstituted (with H) or substituted (with other than H). $R^5$ and $R^6$ independently can be substituted or unsubstituted alkyl groups with 1, 2, 3, 4, 5, or 6 carbon atoms.

In some embodiments, for example where the crosslinking moiety includes a silyl ether group, the crosslinking moiety can further include a secondary amino group. The option including a secondary amino group (R—NH—R') is described above. In embodiments where the crosslinking moiety includes the silyl ether group but not a secondary amino group, the melt-processed mixture (and the final TRC-PO polymer) suitably includes one or more of a Lewis acid, a Brønsted acid, or a boronic ester to improve melt re-processability.

For example, the melt-processed mixture further can further include a Lewis acid catalyst and/or Brønsted acid catalyst. Catalyst-assisted silyl ethers (e.g., without a secondary amine) can also behave reversibly. Suitable catalysts include Lewis acids (e.g., Zn(OTf)$_2$ and Sc(OTf)$_3$) and Brønsted acids (e.g., camphor sulfonic acid, CSA), although other Lewis and Brønsted acids known in the art are suitable. The catalysts can be included in the melt-processed mixture in an amount of about 5 mol. % (relative to silyl ether groups), for example about 0.01-20 wt. % or mol. %, or 1-5 wt. % or mol. %, relative to the weight or number of crosslinking moieties (silyl ether groups). Alternatively or additionally, the catalysts can be included in the melt-processed mixture in an amount of 0.01-5 wt. % or 0.1-2 wt. %, relative to the weight of the polyolefins. As amines can deactivate Lewis acids, such Lewis acid catalysts are preferably used when the crosslinking moiety does not a secondary amino group. Similarly, Brønsted acids are preferably used when the crosslinking moiety does not a secondary amino group. When included, the Lewis and/or Brønsted acids remain in the final TRC-PO product to permit repeated thermal re-processing.

Alternatively or additionally, the melt-processed mixture can further include a boronic compound. Silyl ether (Si—O—Si) linkages without secondary amines in the TRC-PO product undergo reversible crosslinking with boronic acids, which allow subsequent melt-reprocessing, thus creating extrudable vitrimers. Some examples of these boronic compounds include monoboronic acid (e.g., boronic acid), diboronic acid (e.g., 9,9-Didodecylfluorene-2,7-diboronic acid), etc. The boronic compound can be included in the melt-processed mixture in an amount of 0.01-10 wt. %, 0.1-5 wt. %, or 0.1-2 wt. %, relative to the weight of the polyolefins. When included, the boronic compound remains in the final TRC-PO product to permit repeated thermal re-processing.

In embodiments, the crosslinking moiety can include an ester group. The ester group is not particularly limited. In an embodiment, the ester group can correspond to a reaction product of a polyepoxide (e.g., diepoxide) or a polyol (e.g., diol) with an acid group such as a carboxylic acid group formed by hydrolysis and ring-opening of an anhydride grafting agent (e.g., maleic anhydride). In addition to the grafting agent and polyepoxide/polyol, the ester reaction product can be formed with one or more additional acid- or anhydride-containing compounds, for example compounds with two or more anhydride groups, two or more carboxylic acid groups, and/or at least one sulfonic acid group. Hydrolysis and ring-opening of the anhydride groups can form an ester link and a sterically close carboxylic acid group as an internal transesterification acid catalyst. Carboxylic acid groups can form an ester link. Sulfonic acid groups can provide a sterically close acid group as an internal transesterification acid catalyst, for example when the sulfonic acid group is incorporated into a compound containing anhydride or carboxylic acid groups for ester formation. Suitable polyepoxides can include diepoxides having from 5 to 20 carbon atoms and two epoxide or oxirane groups (e.g., at opposing ends of a carbon chain). Suitable polyols can include diols having from 2 to 20 carbon atoms and two hydroxyl groups (at opposing ends of a carbon chain). Suitable co-reactants with additional anhydride, carboxylic acid, and/or sulfonic acid groups include pyromellitic dianhydride, 1,2,4,5-benzenetetracarboxylic acid, 1,2,4-benzenetricarboxylic acid, 1,2-(sulfonyl)benzoic acid, etc. Examples of suitable polyepoxides include diepoxy (e.g., poly(ethylene glycol) diglycidyl ether; 1,2,7,8-Diepoxyoctane), polyepoxy (e.g., poly(styrene-co-glycidyl methacrylate)), etc. Examples of suitable polyols include triols, such as polycaprolactone triol, glycerol ethoxylate-co-propoxylate triol and diols, for example diols with 2 to 12 carbon atoms, such as 1,2-ethanediol, 1,3-propanediol, 1,4-butanediol, 1,6-hexanediol, 1,4-hexanediol, 1,4-cyclohexanediol, 1,4-cyclohexanedimethylanol, 1,8-octanediol, and 1,10-decanediol.

In some embodiments, for example where the crosslinking moiety includes an ester group, the crosslinking moiety further includes an internal transesterification acid catalyst. The internal transesterification acid catalyst is generally a carboxylic acid (—COOH) or sulfonic acid (—SO$_3$H) group that is sterically close to the ester group in the crosslinking moiety. The sterically close spatial relationship between the acid catalyst group and the ester group in turn promotes transesterification reactions, in particular at elevated temperatures suitable for initial melt processing and subsequent melt re-processing, thus providing the thermally reversible crosslinks in the TRC-PO. In embodiments where the crosslinking moiety includes the ester group but not an internal transesterification acid catalyst, the melt-processed mixture (and the final TRC-PO polymer) suitably includes an external catalyst.

Alternatively or additionally, for example where the crosslinking moiety includes an ester group, the melt-processed mixture can further include an external transesterification acid catalyst. The external catalyst can be included in the melt-processed mixture in an amount of 0.01-5 wt. % or 0.1-2 wt. %, relative to the weight of the polyolefins. When included, the external catalyst remains in the final TRC-PO product to permit repeated thermal re-processing. Examples of suitable external catalysts include zinc- and tin-based transesterification catalysts, for example zinc alkanoates (e.g., zinc acetate, zinc ethyl hexanoate, etc.) and organotin compounds (e.g., dibutyltin dilaurate or other alkanoates).

Figure 5:
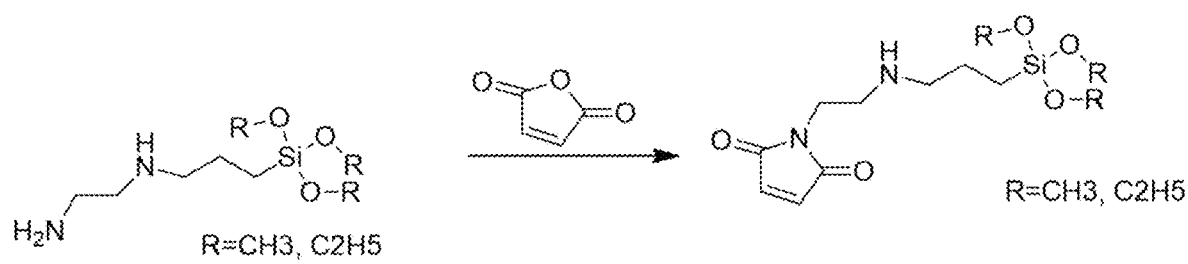
FIG. 5 illustrates a reversible crosslinker according to the disclosure including an unsaturated cyclic imide grafting agent moiety and a silyl ether crosslinking group.
Figure 6:
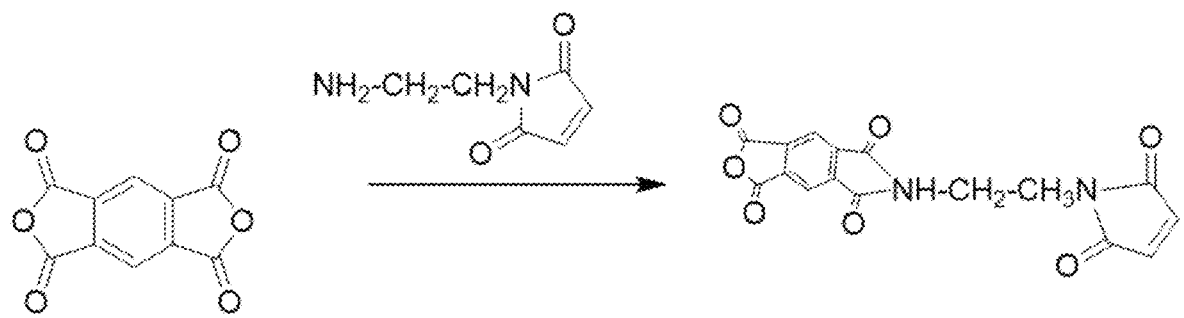
FIG. 6 illustrates a reversible crosslinker according to the disclosure including an unsaturated cyclic imide grafting agent moiety and an anhydride group for formation of an ester crosslinking group.
Figure 7:
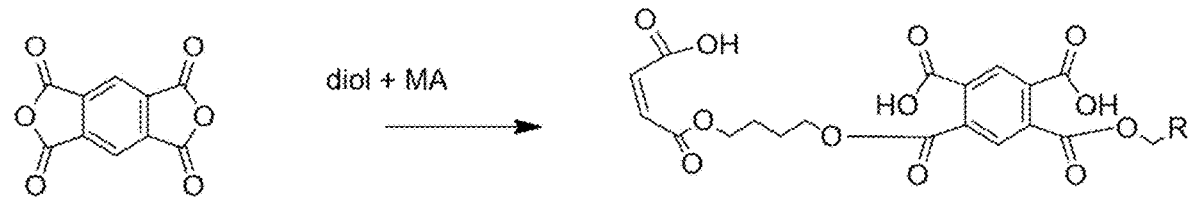
FIG. 7 illustrates a reversible crosslinker according to the disclosure including an unsaturated ring-opened cyclic anhydride grafting agent moiety and an ester crosslinking group.
Figure 8:
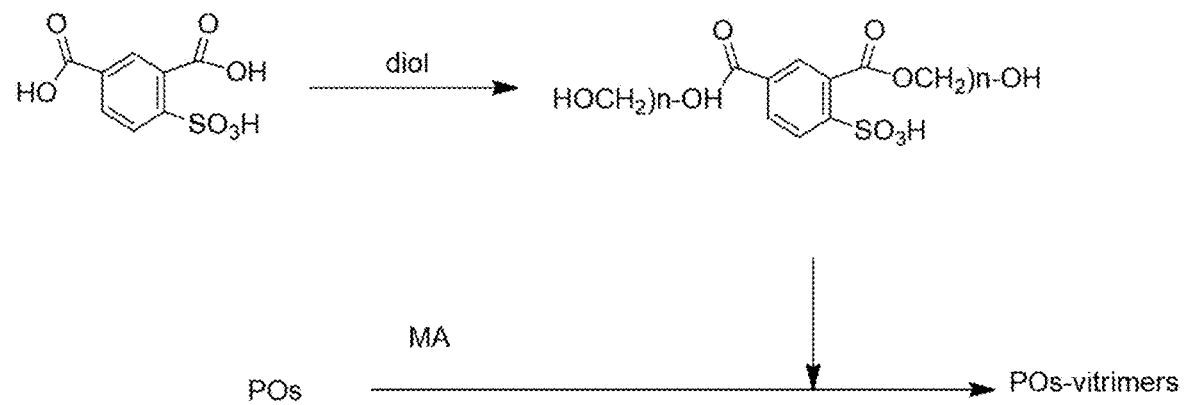
FIG. 8 illustrates a reversible crosslinker according to the disclosure including an ester crosslinking group and sulfonic acid internal esterification catalyst.
Figure 9:
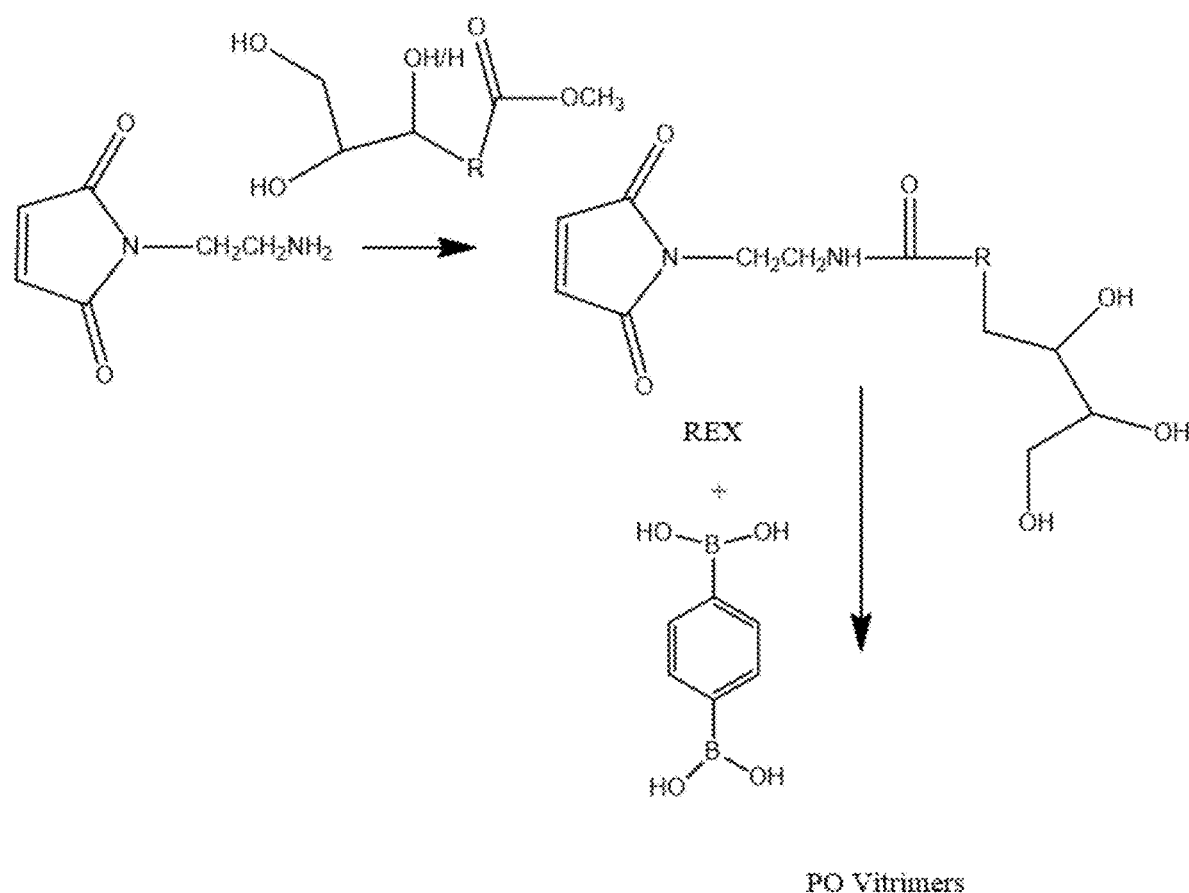
FIG. 9 illustrates a reversible crosslinker according to the disclosure including an unsaturated cyclic imide grafting agent moiety and a boronic ester crosslinking group.

FIGS. 5-9 illustrate representative reversible crosslinkers according to the disclosure. FIG. 5 illustrates a reversible crosslinker including an unsaturated cyclic imide grafting agent moiety and a silyl ether crosslinking group. The reversible crosslinker can be formed by reacting maleic anhydride with an aminoalkyl trialkoxysilane form the unsaturated cyclic imide group with pendant silyl ether groups and an intervening secondary amino group. FIG. 6 illustrates a reversible crosslinker including an unsaturated cyclic imide grafting agent moiety and an anhydride group for formation of an ester crosslinking group. An aminoalkyl unsaturated cyclic imide can be reacted with pyromellitic dianhydride to form the illustrated adduct with a remaining anhydride group. During reactive extrusion with a polyol (e.g., diol), the remaining anhydride group in the adduct can form an ester crosslinking group and a neighboring internal carboxylic acid transesterification catalyst via ring-opening esterification with the polyol, thus forming the reversible crosslinker in situ. FIG. 7 illustrates a reversible crosslinker including an unsaturated ring-opened cyclic anhydride grafting agent moiety and an ester crosslinking group. The reversible crosslinker can be formed by reacting maleic anhydride with a polyol (e.g., alkylene diol) and pyromellitic dianhydride to form the ring-opening maleic anhydride as the grafting agent moiety, the ester groups as the crosslinking moiety, and ring-opened pyromellitic dianhydride as the internal carboxylic acid transesterification catalyst. FIG. 8 illustrates a reversible crosslinker according to the disclosure including an ester crosslinking group and sulfonic acid internal esterification catalyst. An initial adduct for the reversible crosslinker can be formed by reacting a polyol (e.g., alkylene diol) with benzene-1,3-dicarboxylic-4-sulfonic acid to form ester groups as the crosslinking moiety with the remaining sulfonic acid group as the internal carboxylic acid transesterification catalyst. The reversible crosslinker can then be formed in situ by reactive extrusion of the PO with maleic anhydride to form an unsaturated ring-opened cyclic anhydride grafting agent moiety, which in turn grafts to the PO backbone to form the TRC-PO. FIG. 9 illustrates a reversible crosslinker including an unsaturated cyclic imide grafting agent moiety and ester crosslinking group. An aminoalkyl unsaturated cyclic imide can be reacted with a polyhydroxy-functional ester to form the illustrated adduct with pendant hydroxy groups. During reactive extrusion with a boronic acid, the pendant hydroxy groups in the adduct can form boronic ester crosslinking groups, thus forming the reversible crosslinker in situ.

FIG. 10 illustrates representative mechanisms for forming silyl ether-based reversible crosslinks according to the disclosure. Both the nature and amount of thermally reversible crosslinker (TRC) dictate the processing conditions, working temperature, and overall performance of the TRC-PE. Silyl ethers can be used to create TRC-POs as generally illustrated in FIG. 2 (panel A) with a unique and versatile set of properties. Crosslinking can be promoted by the addition of about 1-2 parts per hundred (pph) water to induce sol-gel chemistry. Silyl-ethers are selected based on their excellent thermal stability and reversibility at elevated temperatures, which are important considerations for engineering applications. Silyl ethers can utilize moisture to facilitate crosslinking. In conventional polymer systems, silyl ethers have limited processability due to their non-reversible nature, which has been a key roadblock in creating melt-(re)processable TRC polymers. In the present disclosure, however, alternative approaches can be used to prepare silyl ether-based thermally reversible crosslinks in a corresponding TRC-PO. As illustrated in FIG. 10 (panel A), secondary amine-based silyl ethers (sec-amine silyl ethers) can be used in combination with an unsaturated cyclic imide or other grafting agent moiety. These silyl ethers are not only resistant to thermal oxidation, but their dynamic exchange is also much faster than those of the silyl ethers that lack secondary amines. The TRC-POs according to the disclosure can incorporate a relatively dense grafting (e.g., about 5-10 mol %) of the sec-amine silyl ethers onto PO backbone, for example by using maleimide with co-agents such as antioxidants and electron donors to create a gel-free densely crosslinked TRC-PE as a representative TRC-PO. As further illustrated in FIG. 10 (panel B) A silyl ether-based TRC-PO incorporating TEMPO can be used to achieve dense grafting of the silyl ether. Catalyst-assisted silyl ethers (i.e., without secondary amine) also behave reversibly, where about 5 mol. % of a Brønsted acid (e.g., camphor sulfonic acid, CSA) or a Lewis acid (Zn(OTD$_2$ or Sc(OTf)$_3$) can be used as catalysts. Brønsted and/or Lewis acids can be used with silyl ethers (e.g., without a sec amine) to improve their melt-(re)processability using reactive extrusion or other reactive melt-processing methods. As amines can deactivate Lewis acids, silyl ethers that lack sec-amines can be used with Lewis catalysts. Silyl ethers are particularly suitable as thermally reversible crosslinkers in a TRC-PO due to their thermal stability and tailorable $T_v$ temperatures.

Figure 11:
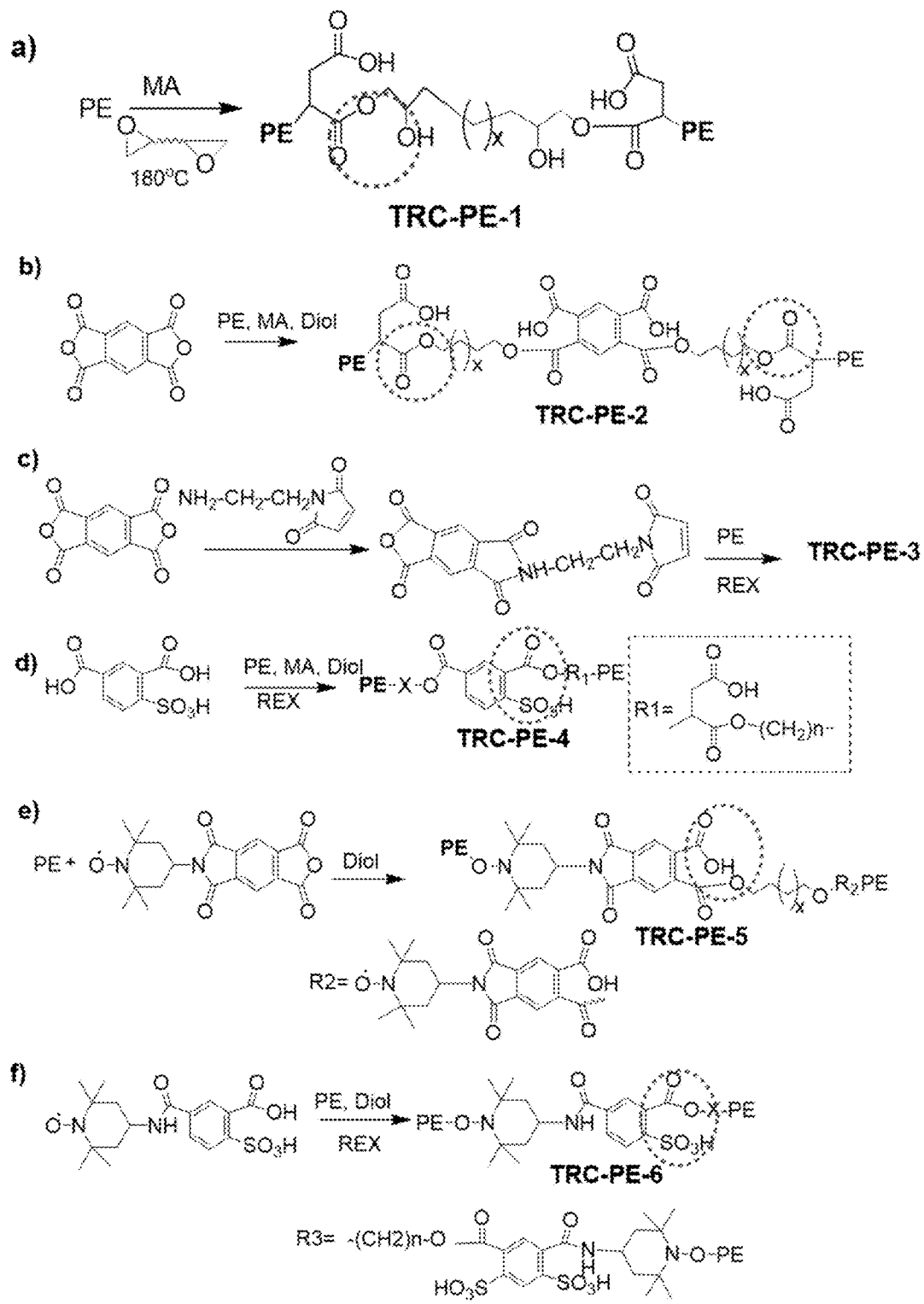
FIG. 11 illustrates representative mechanisms for forming ester-based reversible crosslinks according to the disclosure.

FIG. 11 illustrates representative mechanisms for forming ester based reversible crosslinks according to the disclosure. A simple mechanism for the transesterification of the reversible ester crosslinks in a TRC-PO is shown in FIG. 2 (panel B). Upon heating, rapid exchange reactions allow the rearrangement of the network structure, thus enabling the material to be deformed and remolded. For polyesters, an external and/or an internal catalyst can be used to promote transesterification for the reversible ester crosslinks. As one way to create ester-based TRC-PE (or other TRC-PO more generally), MA-grafted PE can be subjected to diepoxy reaction, where the resulting exchangeable ester bond provides reversibility (FIG. 11, panel a). The TRC-PE-1 in FIG. 11 can utilize an external catalyst (e.g., a Lewis acid catalyst) to promote initial crosslinking and subsequent melt-(re)processing. As variously illustrated in panels b-e of FIG. 11, several other strategies can be used to facilitate the fast-exchange of the ester bonds and enhance the melt-(re) processability: (1) added external catalysts; (2) added excess of hydroxy groups; (3) internal catalysts where the ester is in close proximity to the acidic functional groups; and (4) controlled/selected degree of crosslinking. For the internal catalyst systems or internal catalysts, a cyclic system can be used where the acid proton (e.g., a carboxylic acid group or sulfonic acid group) is in close proximity to the ester. The TRC-PE-2 to TRC-PE-6 in FIG. 11 incorporate an internal catalyst due to the acidic group that is in close proximity relative to the ester group (e.g., at the ortho position on the aromatic ring). In FIG. 11, encircled esters indicate locations where rapid exchange and transesterification can occur for thermally reversible crosslinks.

Optional Components

In addition to the catalysts mentioned above, the melt-processed mixture and/or the final TRC-PO can include one or more optional additives or fillers to improve processability and/or the final physical, mechanical, chemical, and/or omniphobic properties of the TRC-PO. For example, the melt-processed mixture or TRC-PO can include an additive such as one or more of rheology modifiers, co-agents, fillers, and combinations thereof. Examples of rheology modifiers include waxes, plant oils, low-MW (molecular weight) polyolefins (e.g., for a silyl ether system) or for transesterification system low-MW linear polyesters and polyolefins. Suitable MW ranges for such rheology modifiers include 200-5000 g/mol, and the rheology modifiers remain in admixture with the final TRC-PO (i.e., non-reactive). Example co-agents include donor molecules such as N,N'-ethylenebis(stearamide), dimethyl formamide (DMF), dimethyl acetamide, to suppress crosslinking in PE and suppress chain scission in PP. Butylated hydroxytoluene (BHT), dithiocarbamyl, as well as TEMPO or other nitroxide radical can be used as a co-agent to increase grafting density. Examples of suitable fillers or additives include nanoclay, graphene oxide, graphene, silicon dioxide (silica), aluminum oxide, diatomaceous earth, cellulose nanocrystals, carbon nanotubes, titanium dioxide (titania), and combinations or mixtures thereof. In addition, the fillers can include biocides, fibers (e.g., glass, wood, carbon), pigments (e.g., organic or inorganic pigments), dyes, or a combination thereof. The additives can be included individually or collectively in an amount of 0.01-20 wt. %, 0.1-10 wt. %, or 1-5 wt. %, for example expressed relative to the reactive melt-processing mixture used to form the TRC-PO or expressed relative to the PO component(s) thereof. For example, individual additives (or all additives collectively) can be present in amount of at least 0.01, 0.02, 0.05, 0.1, 0.2, 0.5, 1, 2, 3, 5, 7 or 10 wt. % and/or up to 0.3, 0.4, 0.6, 0.8, 1, 2, 4, 6, 8, 12, 15, or 20 wt. %. The foregoing ranges can apply to individual additives (or all additives collectively) expressed relative to the corresponding TRC-PO.

In embodiments, the TRC-PO (e.g., TRC-PO vitrimers) can incorporate a low-surface energy component, for example to improve the omniphobic properties of the TRC-PO. Such low-surface energy component can include siloxanes such as a polysiloxane (e.g., polydimethyl siloxane or PDMS). The siloxane can be part of the TRC crosslinker, for example being part of or bound to a silyl ether group as the crosslinker. In another embodiment, the siloxane can be grafted to the PO carbon-carbon backbone directly as a pendant group (i.e., not forming a crosslink with other PO chains), for example using a PDMS-maleimide or a PDMS-maleic acid/anhydride ester reaction product for grafting onto the PO backbone. In the latter case, the TRC-PO performance will be due to the linkers described above, while PDMS will impart only low surface energy. The PDMS or other low-surface energy component or additive can be present in an amount of 0.01-20 wt. %, 0.1-10 wt. %, or 1-5 wt. %, including the various sub-ranges described above for other additives, for example expressed relative to the reactive melt-processing mixture used to form the TRC-PO, relative to the PO component(s) thereof, or relative to the final TRC-PO.

TRC-PO Compositions and Methods

The TRC-PO composition can be formed by any suitable method for reactive melt-processing of its mixture including the polyolefin, the initiator, the reversible crosslinker, and any other optional additives, fillers, processing aids, etc. Suitably, reactive melt-processing of the mixture is performed by reactively extruding the mixture. Any apparatus typically used for melt-processing of the PO polymers may be used, for example twin- and single-screw extrusion apparatus operated at a sufficiently high temperature to melt the base polyolefin material.

In some embodiments, the reversible crosslinker is already formed when it is added to the reactive melt-processing mixture. For example, the reversible crosslinker can be an anhydride or imide grafting agent already including a pendant silyl ether/alkoxy silane group, which is then added to the polyolefin and initiator for grafting and formation of the TRC-PO.

In other embodiments, the reversible crosslinker is formed in situ during reactive melt-processing by adding a grafting agent reactive with the polyolefin and crosslinker reactive with the grafting agent to the reactive melt-processing mixture. For example, maleic anhydride can be added as the grafting agent. A diepoxide can be added as crosslinker, to form crosslinking ester bonds capable of transesterification with an external catalyst. Alternatively or additionally, a diol and di- or polyahydride (e.g., pyromellitic dianhydride) can be added as crosslinkers to form crosslinking ester bonds capable of transesterification with the internal catalyst resulting from anhydride ring openings.

The crosslinking density in the final TRC-PO is not particularly limited and can be controlled or selected based on the final properties of the TRC-PO, for example to control or select various mechanical properties such as tensile strength or stress (e.g., at yield or break), modulus, elongation at break, etc. In embodiments, the TRC-PO suitably has a crosslinking density (or graft density) in a range from 0.5 mol. % to 40 mol. %, 1 mol. % to 20 mol. %, or 5 mol. % to 10 mol. %, for example at least 1, 2, 3, 5, 7, or 10 mol. % and/or up to 6, 8, 10, 12, 15, 20, 30, or 40 mol. %. The mole percent for crosslinking density represents the fraction of PO monomer units containing a grafted reversible crosslinker. For example, a TRC-PO based on PE with a crosslinking density of 10 mol. % has an average of one grafted reversible crosslinking unit (i.e., a backbone-bound grafting agent moiety) for every ten ethylene monomer units. In an embodiment, desirably high crosslinking densities can be obtained by 1) using of reversible radical capture agents (such as (TEMPO) and dithiocarbamyl) that allow more grafting without promoting C—C irreversible crosslinking, and 2) matching surface energies (such as use of functional maleimide with surface energies nearly similar that of polyolefins), which allows better mixing and thus higher grafting/crosslinking densities.

The final TRC-PO is suitably gel-free or substantially gel-free, for example being free or substantially free of irreversible crosslinks. An advantage of the TRC-PO is that it does not exhibit gelation at its desirably high crosslinking density. For example, a TRC-PO that is gel-free is melt-processable (and melt-reprocessable) without formation of significant polymer gel particles corresponding to (irreversible) crosslinks. In embodiments, the TRC-PO suitably has an irreversible crosslinking density of 0.5 mol. % or less, for example at least 0.0001, 0.001, or 0.01 mol. % and/or up to 0.1, 0.2, 0.3, 0.4, or 0.5 mol. %. The mole percent for irreversible crosslinking density represents the fraction of PO monomer units containing a grafted irreversible crosslinker, for example representing an essentially permanent covalent bond.

The disclosure further relates to a recycling method in which the TRC-PO, having already been formed and including its reversible crosslinked, is subsequently melt-processed or melt-reprocessed, such as by extrusion. This reflects the ability to thermally re-process a TRC-PO into a new shape or article, for example after having been recycled or recovered from a plastics waste stream. The recycling method can simply include melt-processing (i.e., it need not include reactive melt-processing), because the reversible crosslinkers have been previously grafted onto the PO chains to create the thermally reversible crosslinks. The application of heat, combined with the secondary amino groups, internal acid catalysts, Lewis acid catalyst, Brønsted acid catalyst, external catalyst, etc. already present in the TRC-PO (i.e., in admixture therewith or chemically bound thereto) can activate the dynamic equilibrium for the reversible crosslinks that allows the TRC-PO to be melt processed, after which the more stable, more static crosslinks re-form upon cooling to normal use temperatures. In some embodiments, however, it can be desirable to add fresh catalysts that are not otherwise incorporated into the TRC-PO structure, for example Lewis acid catalyst, Brønsted acid catalyst, external catalyst, etc. In some embodiments, the TRC-PO to be recycled and melt-processed can already include one or more additives or fillers as described above, for example having been combined with the PO, initiator, and reversible crosslinker upon initial formation of the TRC-PO, and such additives and/or fillers can remain in the recycled TRC-PO at similar levels as described above. Alternatively or additionally, in some embodiments, one or more additives or fillers as described above can be added to the TRC-PO at the point of recycling and melt-processing, for example being added to and present in the recycled TRC-PO at similar levels as described above. Such additives or fillers added at the point of recycling and melt-processing can be in addition to any additives or fillers present in the TRC-PO prior to recycling (e.g., upon initial formation of the TRC-PO).

The TRC-PO product can be used in a variety of applications, regardless of what the lifecycle stage is for the TRC-P). For example, the TRC-PO for incorporation into a new, end-use product can be (1) a TRC-PO product formed from a fresh/virgin PO feedstock (e.g., reactive melt-processing), (2) a TRC-PO product formed from a recycled PO feedstock (e.g., reactive melt-processing), or (3) a TRC-PO product formed from a recycled TRC-PO feedstock (e.g., melt-reprocessing). For example, the obtained TRC-PO product is suitable for use in a variety of applications such as construction, automotive, and manufacturing. In addition, the TRC-PO product can be used to form a powder-based coating on a substrate, for example by crushing or otherwise forming the TRC-PO into a powder, applying or dispensing powered TRC-PO on a substrate, and then heating the TRC-PO powder to melt-process and form the resulting TRC-PO film or coating on the substrate. The TRC-PO product also can be used in a 3D printing or other additive manufacturing process printing, for example by forming the TRC-PO into filaments, and then using the filaments in a melt-processing 3D printer or additive manufacturing apparatus to form mechanically robust and solvent-resistant articles.

EXAMPLES

The following examples illustrate the disclosed compositions and methods, but are not intended to limit the scope of any claims thereto.

Example 1: TRC-HDPE

This example illustrates the formation of an omniphobic TRC-PO according to the disclosure using HDPE (i.e., a TRC-HDPE) as the polyolefin and a reversible crosslinker incorporating an unsaturated cyclic anhydride and ester groups. The TRC-HDPE was compounded and injection molded into specimens that were tested to characterize their mechanical properties.

Methodology: First, HDPE was fed and allowed to melt in extruder, followed by addition of a TRC additive mixture at a level of 2.5 parts additive per hundred parts resin (phr) (w/w) for sample TRC-HDPE_2.5 or at a level of 5 phr. The TRC additive mixture were comprised of maleic anhydride (30 wt %), dicumyl peroxide (5 wt %), 1,10-decane diol (55 wt %), Zn(acetate) (5 wt %), and N,N'-ethylenebis(stearamide) (10 wt %). The TRC additive mixture reactants were fed in four increments over about 20 seconds. N,N'-ethylenebis(stearamide) was used to suppress carbon-carbon permanent crosslinking in PE as reported in literature, while Zn(acetate) was used to offer rapid exchange of ester links in TRC-HDPE. For comparison, neat HDPE was also passed through extrusion without adding any TRC ingredients. After all of the reactants were added the mixture was compounded for 3 minutes. Notably, the addition of the TRC additive mixture did not affect the processability of the TRC-HDPE as compared to neat HDPE. Specimens were prepared in rectangular shapes by injecting melted HDPE and TRC-HDPE into a mold at a temperature of 70° C. The extrusion was performed using a DSM XPLORE 15 cc Micro Extruder equipped with a co-rotating conical twin-screws, and tensile properties of prepared samples were evaluated using a computer controlled universal testing machine (INSTRON 5565) according to ASTM D-638.

The tensile properties of all the samples are summarized in Table 1. Relative to neat HDPE, TRC-HDPE_2.5 showed a 233% increase in the tensile strength, and a 253% increase for TRC-HDPE_5. On the contrary, no such increase in strength is observed for conventional HDPE vitrimers. Relative to neat HDPE, the elongation at break was decreased for both TRC-HDPE_2.5 and TRC-HDPE_5, which is a result of the crosslinked nature of TRC-POs according to the disclosure. Solvent resistance of the samples was also investigated by immersing them in chloroform for 10 min, with "no" in the table below indicating properties before or without solvent immersion, and "yes" indicating properties after solvent immersion. Neat HDPE showed 1.7% increase in the volume caused by solvent absorption, which increased the tensile properties due solvent-induced crystallization and subsequent increase mechanical properties. TRC-HDPE_2.5 showed a 0.70% increase in volume, and TRC-HDPE_5 showed only a 0.10% increase in volume, which shows that TRC-HDPE_5 is at least 17 times more resistant than HDPE to solvent exposure. In addition, solvent dipping had essentially no effect on the elongation at break and other tensile properties of TRC-HDPE_5. In contrast, neat HDPE became brittle upon solvent exposure. These results show that the TRC-polymers have excellent solvent resistant and excellent mechanical properties, while still retaining their melt-(re)processability.

TABLE 1

Example 1 Sample Tensile Properties

| Sample | Solvent Immersion? | Tensile strength (MPa) | Elongation at break (%) | Yield Strength (MPa) |
|---|---|---|---|---|
| Neat HDPE | No | 13 | 300 | 22 |
| Neat HDPE | Yes | n/a | 95 | 29 |
| TRC-HDPE_2.5 | No | 30 | 210 | 30 |
| TRC-HDPE_2.5 | Yes | n/a | 215 | 31 |
| TRC-HDPE_5 | No | 33 | 160 | 33 |
| TRC-HDPE_5 | Yes | n/a | 130 | 32 |

Example 2: Omniphobic TRC-HDPE

This example illustrates the formation of an omniphobic TRC-PO according to the disclosure using HDPE (i.e., a TRC-HDPE) as the polyolefin and a reversible crosslinker incorporating an unsaturated cyclic anhydride and ester groups. The TRC-HDPE further included a low-surface energy component in the form of polydimethylsiloxane (PDMS) with a hydroxy-functional group for incorporation into the reversible crosslinker (i.e., via ester formation) to impart omniphobic or hydrophobic properties. The TRC-HDPE was compounded and injection molded into specimens that were tested to characterize their mechanical properties.

Materials: The following materials were used as provided by their respective manufacturers: high density polyethylene (HDPE), maleic anhydride (MA), dicumyl peroxide (DCPO), 1,10-decane diol (DDO), Zn(acetate), N,N'-ethylenebis(stearamide) (EBSA), Zn ethylhexanoate, and carbinol (hydroxyl) terminated polydimethylsiloxane (PDMS-C16).

Methodology: Various compositions of additives were selected and incorporated in HDPE using a reactive extrusion process to impart omniphobic properties in final extruded system. The extruded materials were tested for their mechanical and omniphobic performance. The additives used an ester-based reversible crosslinker. Specifically, the additives included: (1) maleic anhydride (MA) as a grafting agent, (2) dicumyl peroxide as a radical initiator, (3) 1,10-decane diol as a coupling agent, (4) zinc acetate and zinc ethylhexanoate as catalysts, (5) donor molecules such as N, N'-ethylenebis(stearamide) to suppress irreversible crosslinking in polyethylene, and (6) PDMS as a low-surface energy component.

Several additive mixtures as summarized in Table 2 were prepared. A commercial HDPE resin was combined with various additive mixtures via extrusion to form TRC-HDPE samples according to the disclosure. The extrusion was performed using a DSM XPLORE 15 cc Micro Extruder equipped with a co-rotating conical twin-screws, while samples were molded using a 3.5 cc injection molder. First, HDPE was fed in and allowed to melt in an extruder at a temperature of 180° C., followed by the additions of reactive additives in two increments over about 20 seconds. After addition of all reactants, the mixture was compounded for 3 minutes. Specimens were prepared in rectangular shapes by injecting the melted mixture into a mold at a temperature of 80° C. For comparison, neat HDPE specimens were prepared through extrusion without reactive additive. The sample compositions are summarized in Table 3 below.

TABLE 2

Example 2 Additive Mixtures

| Additive | Composition |
|---|---|
| PDMS-1 | Maleic anhydride (8.4 g), Dicumyl peroxide (0.75 g); |
| | 1,10-hexane diol (10 g); (20 g); |
| | N,N'-ethylenebis(stearamide) (2 g) |
| P-1 | Zn ethylhexanoate (2 g) and PDMS-C16 (50 g) |
| PDMS-2 | Maleic anhydride (8.4 g), Dicumyl peroxide (0.75 g); |
| | 1,10-hexane diol (10 g); (20 g); |
| | N,N'-ethylenebis(stearamide) (2 g) |
| P-2 | Zn ethylhexanoate (2 g) and PDMS-C16 (50 g) |

TABLE 3

Example 2 Sample Compositions

| Sample | HDPE | Reactive Additive 1 | Reactive Additive 2 |
|---|---|---|---|
| Neat HDPE | 100 g | — | — |
| TRC HDPE-PDMS-1 | 90 g | 4.9 g PDMS-1 | 5.1 g P-1 |
| TRC HDPE-PDMS-2 | 80 g | 2.9 g PDMS-2 | 7.1 g P-2 |

Characterization and Results: Tensile properties of prepared samples were evaluated using a computer controlled universal testing machine (INSTRON 5565) according to ASTM D-638. The samples were tested at a crosshead speed of 10 mm/min. A 590-U1 Advanced Automated Goniometer (Ramé-Hart Instrument Co., NJ) was used to measure contact angles (CAs) and sliding angles (SAs). The tensile and omniphobic properties of all the samples are summarized in Table 4.

Table 4

Example 2 Sample Tensile and Omniphobic Properties

| Sample | Tensile stress at yield (MPa) | Tensile stress at break (MPa) | Modulus (MPa) | Elongation at break (%) | Contact angle (°) | Sliding angle (°) | Hysteresis |
|---|---|---|---|---|---|---|---|
| Neat HDPE | 26 | 8 | 130 | 250 | 79.6 | 27 | 0.3796 |
| TRC HDPE-PDMS-1 | 28 | 18 | 150 | 350 | 86.5 | 17 | 0.2582 |
| TRC HDPE-PDMS-2 | 31 | 8 | 180 | 200 | 84.3 | 25 | 0.3433 |

Example 3: TRC-HDPE Printing Filaments

This example illustrates the formation of a TRC-PO according to the disclosure using HDPE (i.e., a TRC-HDPE) as the polyolefin and a reversible crosslinker incorporating an unsaturated cyclic anhydride and ester groups. The TRC-HDPE was fabricated into filaments, for example for use as 3D printing filaments in an additive manufacturing process. The TRC-HDPE was tested for its ability to form 3D-printed objects as well as to characterize its mechanical and chemical properties.

Materials: The following materials were used as provided by their respective manufacturers: High density polyethylene (HDPE), maleic anhydride (MA), dicumyl peroxide (DCPO), 1,10-decane diol (DDO), Zn(acetate), N, N'-ethylenebis(stearamide) (EBSA), 4-hydroxy-2,2,6,6-tetramethylpiperidine 1-oxyl (4-hydroxy-TEMPO), and carbon black (graphite).

Methodology: Various compositions of additives were selected and incorporated in HDPE using a reactive extrusion process to prepare 3D printable reversibly crosslinked polyethylene-based material. The extruded material was converted into pellets and further processed for making micro-filament for 3D printings. Finally, the prepared filament was tested for 3D printing and 3D printed samples were tested for their mechanical and thermal properties. The additives used an ester-based reversible crosslinker. Specifically, the additives included: (1) maleic anhydride (MA) as a grafting agent, (2) dicumyl peroxide as a radical initiator, (3) alkane diols (e.g., 1,10-decane diol) as a coupling agent, (4) zinc acetate as a catalyst, and (5) donor molecules such as N, N'-ethylenebis(stearamide) to suppress irreversible crosslinking in polyethylene.

An additive mixture was formed as follows: maleic anhydride (8.4 g), dicumyl peroxide (0.75 g), 1,10-decane diol (12 g); Zn(acetate) (2 g), N, N'-ethylenebis(stearamide) (2 g), and 4-hydroxy-TEMPO (1 g). The additive mixture was added to HDPE in an amount of 5 wt. % additive mixture relative to HDPE. Two commercial HDPE resins (HDPE 1, HDPE 2) were combined with the additive mixture along with a variable amount of carbon black/graphite fillers (expressed as wt. % relative to resin) via extrusion to form TRC-HDPE samples according to the disclosure. The carbon fillers were added to minimize warping of the samples. The extrusion was performed using a DSM XPLORE 15 cc Micro Extruder equipped with a co-rotating conical twin-screws. First, HDPE and the additives were mixed and fed into an extruder at a temperature of 185° C. in three increments. The mixture was compounded for 4 minutes. Then, the molten mixture was extruded as macro-filament to make its pellets later for micro-filament preparation for 3D printing. The sample compositions are summarized in Table 5 below.

TABLE 5

Example 3 Sample Compositions

| Sample | Composition |
|---|---|
| NK-2 | Neat Commercial HDPE 1 |
| NK-2A | TRC-HDPE |
| NK-2C | TRC-HDPE + CB 0.5% |
| NK-2B | TRC-HDPE + CB 1% |
| NK-2E | TRC-HDPE + CB 20% |
| NK-4 | Neat Commercial HDPE 2 |
| NK-4A | TRC-HDPE |
| NK-4C | TRC-HDPE + CB 0.5% |
| NK-4B | TRC-HDPE + CB 1% |
| NK-4D | TRC-HDPE + CB 5% |

3D Printing: A FILA BOT EX2 system was used as a filament extruder for preparing filaments for 3D printing. Melt processing temperature, screw speed, cooling, and drive speed were selected to provide filament of consistent diameter (i.e., ~1.70 mm). This filament was collected on a reel plastic spool and stored. A QIDI TECH X-ONE2 3D printer was used for 3D printing. The samples were designed using SOLIDWORKS software (Version 2018 SP5.0). The 3D printable soft-file for the 3D printer was generated using QIDIPRINT window-based applications. 3D printing was performed with a layer height of 0.2 mm, infill of 50%, print speed of 60 mm/s, travel speed 100 mm/s and using minimum layer time of 30 s. The printing temperature for the prepared filament was set at 250° C. and a build plate temperature of 120° C. The 3D printable performance of prepared filaments was evaluated by measuring tensile properties using a computer controlled universal testing machine (INSTRON 5565) according to ASTM D-638. The samples were tested at a crosshead speed of 10 mm/min. Further, the samples were also measured via differential scanning calorimetry to determine their melting points.

Results: The 3D printed dumbbell samples formed from TRC-HDPE exhibited insignificant warping relative to commodity HDPE. The tensile properties of all the samples are summarized in Table 6. A higher weight percent of carbon black samples (5% and 20%) are also shown. 3D-printed samples using commercially available polylactic acid (PLA) and acrylonitrile butadiene styrene (ABS) are also shown for comparison. Sample NK-4C provided a favorable combination of mechanical properties. It can be inferred that the TRC-HDPE with 0.5% carbon black indeed enhances the tensile stress at break by 63% as compared to the neat HDPE. Similar trends are observed with elongation at break % where the property is enhanced by 200%. Moreover, other properties such as tensile stress at yield and modulus are not altered thereby retaining the properties of HDPE. This is illustrated by the melting points of these systems that are summarized in Table 7. TRC-HDPE with about 0.5% filler (carbon black) was the most suitable sample tested for 3D printing properties.

TABLE 6

Example 3 Sample Tensile Properties

| Sample | Composition | Tensile stress at yield (MPa) | Tensile stress at break (MPa) | Modulus (MPa) | Elongation at break (%) |
|---|---|---|---|---|---|
| NK-2 | Neat Commercial HDPE 1 | 25.28 | 10.31 | 438 | 95.45 |
| NK-2A | TRC-HDPE | 28.35 | 16.92 | 302 | 540.37 |
| NK-2C | TRC-HDPE + CB 0.5% | 26.68 | 18.2 | 377 | 296.01 |
| NK-2B | TRC-HDPE + CB 1% | 28.62 | 13.92 | 386 | 160 |
| NK-2E | TRC-HDPE + CB 20% | 26.92 | 25.24 | 540 | 11.51 |
| NK-4 | Neat Commercial HDPE 2 | 25.12 | 12.91 | 388 | 222.78 |
| NK-4A | TRC-HDPE | 23.05 | 9.26 | 416 | 43.36 |
| NK-4C | TRC-HDPE + CB 0.5% | 27.09 | 19.3 | 443 | 649.31 |
| NK-4B | TRC-HDPE + CB 1% | 26.65 | 10.68 | 464 | 46.44 |
| NK-4D | TRC-HDPE + CB 5% | 26.51 | 10.65 | 455 | 40.07 |
| PLA-1 | PLA | 50.88 | 43.09 | 1477 | 8.61 |
| ABS-1 | ABS | 46.79 | 40.12 | 1347 | 6.15 |

TABLE 7

Example 3 Sample Melting Points

| Sample | Composition | Melting Point (° C.) |
|---|---|---|
| NK-2 | Neat Commercial HDPE 1 | 133.71 |
| NK-2A | TRC-HDPE | 135.09 |
| NK-2C | TRC-HDPE + CB 0.5% | 131.25 |
| NK-2B | TRC-HDPE + CB 1% | 131.62 |
| NK-4 | Neat Commercial HDPE 2 | 136.47 |
| NK-4A | TRC-HDPE | 135.67 |
| NK-4C | TRC-HDPE + CB 0.5% | 132.5 |
| NK-4B | TRC-HDPE + CB 1% | 133.77 |

Summary: Warping and tensile properties are important issues when commodity plastics like HDPE is used to make 3D printing filaments. The example illustrate the use of TRC-HPDE according to the disclosure to provide low-cost 3D printing filaments from commodity plastics without warping and with improved tensile properties relative to neat HDPE.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A method for forming a thermally reversibly crosslinked (TRC) polyolefin, the method comprising:
   reactive melt-processing a mixture comprising (i) a polyolefin, (ii) an initiator, and (iii) a reversible crosslinker comprising (A) a grafting agent moiety selected from the group consisting of unsaturated cyclic anhydrides, unsaturated cyclic imides, cyclic nitroxides, and ring-opened analogs thereof, and (B) a crosslinking moiety bound to the grafting agent moiety, the crosslinking moiety comprising at least one of a silyl ether group and an ester group, thereby forming a thermally reversibly crosslinked (TRC) polyolefin comprising polyolefin chains crosslinked via crosslinking moieties therebetween.

2. The method of claim 1, wherein the polyolefin comprises polyethylene.

3. The method of claim 1, wherein the polyolefin comprises polypropylene.

4. The method of claim 1, wherein the initiator comprises a peroxide free-radical initiator.

5. The method of claim 1, wherein the grafting agent moiety comprises a 5-membered ring structure, a 6-membered ring structure, or a ring-opened analog thereof.

6. The method of claim 1, wherein the grafting agent moiety comprises an unsaturated cyclic anhydride moiety.

7. The method of claim 1, wherein the grafting agent moiety comprises an unsaturated cyclic imide moiety.

8. The method of claim 1, wherein the grafting agent moiety comprises a cyclic nitroxide.

9. The method of claim 1, wherein the crosslinking moiety comprises the silyl ether group.

10. The method of claim 9, wherein the crosslinking moiety further comprises a secondary amino group.

11. The method of claim 9, wherein the mixture being melt-processed further comprises at least one of a Lewis acid catalyst and a Brønsted acid catalyst.

12. The method of claim 9, wherein the mixture being melt-processed further comprises a boronic compound.

13. The method of claim 1, wherein the crosslinking moiety comprises the ester group.

14. The method of claim 13, wherein the crosslinking moiety further comprises an internal transesterification acid catalyst.

15. The method of claim 13, wherein the mixture being melt-processed further comprises an external transesterification acid catalyst.

16. The method of claim 1, wherein the mixture being melt-processed contains the reversible crosslinker in a range from 0.5 mol. % to 40 mol. % relative to the polyolefin.

17. The method of claim 1, wherein the TRC polyolefin has a crosslinking density in a range from 0.5 mol. % to 40 mol. %.

18. The method of claim 1, wherein the TRC polyolefin is gel-free.

19. The method of claim 1, wherein the mixture being melt-processed further comprises an additive selected from the group consisting of rheology modifiers, co-agents, and combinations thereof.

20. The method of claim 1, wherein reactive melt-processing the mixture comprises:
reactively extruding the mixture.

21. The method of claim 1, comprising:
prior to reactive melt-processing, adding to the mixture the reversible crosslinker comprising the grafting agent moiety and the crosslinking moiety bound thereto.

22. The method of claim 1, comprising:
prior to reactive melt-processing, adding to the mixture a grafting agent comprising the grafting agent moiety and a crosslinker, thereby forming the reversible crosslinker as a product between the grafting agent and the crosslinker in situ during reactive melt-processing of the mixture.

23. A method for forming a thermally reversibly crosslinked (TRC) polyolefin, the method comprising:
reactive melt-processing a mixture comprising (i) a polyolefin, (ii) an initiator, and (iii) a reversible crosslinker comprising (A) a grafting agent moiety comprising at least one of an unsaturated cyclic anhydride moiety and an unsaturated cyclic imide moiety, and (B) a crosslinking moiety bound to the grafting agent moiety, thereby forming a thermally reversibly crosslinked (TRC) polyolefin comprising polyolefin chains crosslinked via crosslinking moieties therebetween.

24. The method of claim 23, wherein the polyolefin comprises polyethylene.

25. The method of claim 23, wherein the polyolefin comprises polypropylene.

26. The method of claim 23, wherein the initiator comprises a peroxide free-radical initiator.

27. The method of claim 23, wherein the grafting agent moiety comprises the unsaturated cyclic anhydride moiety.

28. The method of claim 23, wherein the grafting agent moiety comprises the unsaturated cyclic imide moiety.

29. The method of claim 23, wherein the crosslinking moiety comprises a silyl ether group.

30. The method of claim 23, wherein the crosslinking moiety comprises an ester group.

31. The method of claim 23, wherein the mixture being melt-processed contains the reversible crosslinker in a range from 0.5 mol. % to 40 mol. % relative to the polyolefin.

32. The method of claim 23, comprising:
prior to reactive melt-processing, adding to the mixture the reversible crosslinker comprising the grafting agent moiety and the crosslinking moiety bound thereto.

33. The method of claim 23, comprising:
prior to reactive melt-processing, adding to the mixture a grafting agent comprising the grafting agent moiety and a crosslinker, thereby forming the reversible crosslinker as a product between the grafting agent and the crosslinker in situ during reactive melt-processing of the mixture.

34. A method for forming a thermally reversibly crosslinked (TRC) polyolefin, the method comprising:
reactive melt-processing a mixture comprising (i) a polyolefin, (ii) an initiator, and (iii) a reversible crosslinker comprising (A) a grafting agent moiety selected from the group consisting of unsaturated cyclic anhydrides, unsaturated cyclic imides, cyclic nitroxides, and ring-opened analogs thereof, and (B) a crosslinking moiety bound to the grafting agent moiety, thereby forming a thermally reversibly crosslinked (TRC) polyolefin comprising polyolefin chains crosslinked via crosslinking moieties therebetween;
wherein the TRC polyolefin has at least one of properties (I) and (II):
(I) the TRC polyolefin has a crosslinking density in a range from 0.5 mol. % to 40 mol. %; and
(II) the TRC polyolefin is gel-free.

35. The method of claim 34, wherein the polyolefin comprises polyethylene.

36. The method of claim 34, wherein the polyolefin comprises polypropylene.

37. The method of claim 34, wherein the initiator comprises a peroxide free-radical initiator.

38. The method of claim 34, wherein the grafting agent moiety comprises a 5-membered ring structure, a 6-membered ring structure, or a ring-opened analog thereof.

39. The method of claim 34, wherein the grafting agent moiety comprises an unsaturated cyclic anhydride moiety.

40. The method of claim 34, wherein the grafting agent moiety comprises an unsaturated cyclic imide moiety.

41. The method of claim 34, wherein the grafting agent moiety comprises a cyclic nitroxide.

42. The method of claim 34, wherein the crosslinking moiety comprises a silyl ether group.

43. The method of claim 34, wherein the crosslinking moiety comprises an ester group.

44. The method of claim 34, wherein the mixture being melt-processed contains the reversible crosslinker in a range from 0.5 mol. % to 40 mol. % relative to the polyolefin.

45. The method of claim 34, wherein the TRC polyolefin has the property (I) that the TRC polyolefin has a crosslinking density in a range from 0.5 mol. % to 40 mol. %.

46. The method of claim 34, wherein the TRC polyolefin has the property (II) that the TRC polyolefin is gel-free.

47. The method of claim 34, comprising:
prior to reactive melt-processing, adding to the mixture the reversible crosslinker comprising the grafting agent moiety and the crosslinking moiety bound thereto.

48. The method of claim 34, comprising:
prior to reactive melt-processing, adding to the mixture a grafting agent comprising the grafting agent moiety and a crosslinker, thereby forming the reversible crosslinker as a product between the grafting agent and the crosslinker in situ during reactive melt-processing of the mixture.

49. A method for forming a thermally reversibly crosslinked (TRC) polyolefin, the method comprising:
reactive melt-processing a mixture comprising (i) a polyolefin comprising polyproplyene, (ii) an initiator, and (iii) a reversible crosslinker comprising (A) a grafting agent moiety selected from the group consisting of unsaturated cyclic anhydrides, unsaturated cyclic imides, cyclic nitroxides, and ring-opened analogs thereof, and (B) a crosslinking moiety bound to the grafting agent moiety, thereby forming a thermally reversibly crosslinked (TRC) polyolefin comprising polyolefin chains crosslinked via crosslinking moieties therebetween.

50. The method of claim 49, wherein the initiator comprises a peroxide free-radical initiator.

51. The method of claim 49, wherein the grafting agent moiety comprises a 5-membered ring structure, a 6-membered ring structure, or a ring-opened analog thereof.

52. The method of claim 49, wherein the grafting agent moiety comprises an unsaturated cyclic anhydride moiety.

53. The method of claim 49, wherein the grafting agent moiety comprises an unsaturated cyclic imide moiety.

54. The method of claim 49, wherein the grafting agent moiety comprises a cyclic nitroxide.

55. The method of claim 49, wherein the crosslinking moiety comprises a silyl ether group.

56. The method of claim 49, wherein the crosslinking moiety comprises an ester group.

57. The method of claim 49, wherein the mixture being melt-processed contains the reversible crosslinker in a range from 0.5 mol. % to 40 mol. % relative to the polyolefin.

58. The method of claim 49, comprising:
prior to reactive melt-processing, adding to the mixture the reversible crosslinker comprising the grafting agent moiety and the crosslinking moiety bound thereto.

59. The method of claim 49, comprising:
prior to reactive melt-processing, adding to the mixture a grafting agent comprising the grafting agent moiety and a crosslinker, thereby forming the reversible crosslinker as a product between the grafting agent and the crosslinker in situ during reactive melt-processing of the mixture.

* * * * *